(12) United States Patent
Yanagawa

(10) Patent No.: US 7,518,964 B2
(45) Date of Patent: Apr. 14, 2009

(54) INFORMATION RECORD APPARATUS AND METHOD, AND COMPUTER PROGRAM PRODUCT

(75) Inventor: Naoharu Yanagawa, Saitama (JP)

(73) Assignee: Pioneer Corporation, Tokyo (JP)

( * ) Notice: Subject to any disclaimer, the term of this patent is extended or adjusted under 35 U.S.C. 154(b) by 801 days.

(21) Appl. No.: 11/055,611

(22) Filed: Feb. 11, 2005

(65) Prior Publication Data

US 2005/0249074 A1    Nov. 10, 2005

(30) Foreign Application Priority Data

Feb. 13, 2004    (JP) ............................. 2004-036292

(51) Int. Cl.
*G11B 7/00* (2006.01)
(52) U.S. Cl. ............... 369/47.53; 369/59.11; 369/59.24
(58) Field of Classification Search .................. None
See application file for complete search history.

(56) References Cited

U.S. PATENT DOCUMENTS 7,230,895 B2 *    6/2007    Sasaki et al. ............. 369/47.53

FOREIGN PATENT DOCUMENTS

| JP | 2000251256 A | * | 9/2000 |
|---|---|---|---|
| JP | 2003-274358 | | 9/2001 |

OTHER PUBLICATIONS

English Translation of 2000-251256 and 2003-085753.*

* cited by examiner

*Primary Examiner*—Jorge L Ortiz Criado
(74) *Attorney, Agent, or Firm*—Young & Thompson

(57) ABSTRACT

An information record apparatus includes a recording device for recording information into a record medium, where pre-information for controlling a recording of the information is recorded in advance, by irradiating the record medium with a laser beam whose power is varied depending on a driving pulse; a first controlling device for modifying the driving pulse into at least a top pulse and a middle pulse; an optimum ratio detecting device for detecting an optimum ratio that is a pulse ratio at which a first reproduction quality that is a reproduction quality of the pre-information meets a first reference, on the basis of a first correlation information to indicate a correlation between the first reproduction quality and a pulse ratio of at least the top pulse to the middle pulse; and a second controlling device for modifying the driving pulse in accordance with a pulse ratio corresponding to the optimum ratio.

16 Claims, 16 Drawing Sheets

(a)

(b)

(c)

INFORMATION RECORD APPARATUS AND METHOD, AND COMPUTER PROGRAM PRODUCT

BACKGROUND OF THE INVENTION

1. Field of the Invention

The present invention relates to information record apparatuses and methods such as DVD recorders, and computer program products for making computers function as such information record apparatuses.

2. Description of the Related Art

In order to record data into an information record medium such as a DVD-R or a DVD-RW, the recording operation is performed by making record marks which are formed by irradiating a record surface of the information record medium with a laser beam. A waveform of this laser beam is controlled by a pulse strategy for defining a driving pulse to irradiate a laser beam, so as to record the data appropriately. Furthermore, a recording speed for recording the data into/onto the information record medium becomes faster with development of technologies. For example, 2× recording speed or 4× recording speed is realized.

On the other hand, controlling the waveform (or pulse) of the laser beam for the data recording becomes more difficult, as the recording speed becomes faster. In order to address this problem, the inventor and the like proposed a technology to provide a mid bias period (i.e. a period during which a middle pulse is formed) for a part of the laser beam waveform during a mark period to form a record mark (Japanese Patent Application Laid Open No. 2003-85753). Thus, providing the mid bias period makes it possible to control the laser beam waveform appropriately even at a higher recording speed. A ratio of a laser beam power value during a top pulse period in the mark period except for the mid bias period relative to a laser beam power value during a mid bias period is generally referred to as a "Po/Pm ratio". When the data is actually recorded into the information record media, the waveform of the laser beam is controlled by a Po/Pm ratio (or an appropriate pulse strategy) predetermined appropriately, for example, by reading a manufacturer code recorded in advance in the information record medium.

SUMMARY OF THE INVENTION

In some cases, however, especially at a high recording speed, a variation among information record media or information record apparatuses may prevent the data from being recorded appropriately, even by means of an appropriate pulse strategy under a condition that such a mid bias period is provided. For this, in a DVD-R/RW as an example of the information record medium, an AR property that is a reading property of land pre-pits after the data is recorded is deteriorated in particular. That is, because reproduction quality of the land pre-pits after the data is recorded is deteriorated, this land pre-pits cannot be reproduced appropriately. In other words, because the laser beam power cannot be defined appropriately, the data cannot be recorded appropriately into the information record medium, or the recorded data cannot be reproduced appropriately.

The present invention has been accomplished in view of above problems for example. It is therefore an object of the present invention to provide an information record apparatus and method capable of recording data appropriately into an information record medium such as an optical disc, and to provide a computer program product to make a computer function as such an information record apparatus.

Now, an information record apparatus, an information record method, and a computer program product of the present invention will be discussed.

(Information Record Apparatus)

An information record apparatus of the present invention is an information record apparatus comprising: a recording device for recording record information into an information record medium where pre-information for controlling a recording of the record information is recorded in advance, by irradiating the information record medium with a laser beam whose power is varied depending on a driving pulse; a first controlling device for modifying the driving pulse into at least a top pulse and a middle pulse; an optimum ratio detecting device for detecting an optimum ratio that is a pulse ratio at which a first reproduction quality that is a reproduction quality of the pre-information meets a first reference (a first reference), on the basis of at least a first correlation information to indicate a correlation between the first reproduction quality and a pulse ratio of the top pulse and the middle pulse; and a second controlling device for modifying the driving pulse in accordance with a pulse ratio corresponding to the optimum ratio.

According to the information record apparatus of the present invention, with the aid of an operation of the recording device, the laser beam is irradiated into the information record medium to record the record information. In particular, the first controlling device can control the recording device to irradiate the laser beam, with alternately shifting the top pulse having a relatively high peak value (i.e. laser power) and the middle pulse having a relatively low peak value to each other appropriately as the driving pulse for the recording device. That is, it is possible to change the power of the laser beam (specifically, it may be changed into a power corresponding to the top pulse and a power corresponding to the middle pulse, and even a power corresponding to other pulses if needed). Additionally, it is preferable to freely change the power of the laser beam, by changing each peak value of each pulse.

Particularly in the present invention, with regard to the pulse ratio that is a pulse ratio of the top pulse and the middle pulse (e.g. a ratio of peak value of the top pulse and peak value of the middle pulse), there is provided with the optimum ratio detecting device for detecting the pulse ratio, as the optimum ratio, at which the first reproduction quality that is a reproduction quality of the pre-information used to control the recording of the record information meets the first reference. The "first reference" means a reference (and/or a standard) allowing that the first reproduction quality (e.g. an AR (Aperture Ratio) property and the like, as mentioned below) becomes a suitable condition or suitable value, when the pre-information, which is recorded in the record area where the record information is recorded corresponding to a certain pulse ratio, is reproduced. That is, the pre-information whose first reproduction quality meets the first reference can be suitably reproduced, and therefore also the record information can be suitably reproduced. The reproduction quality of the pre-information may be obtained by reproducing the pre-information itself as mentioned later in an example, or may be obtained by reproducing the record information recorded in the record area where the pre-information is recorded. Furthermore, this first reference may be predetermined, or may be determined as appropriate depending on the recording operation. The optimum ratio is detected on the basis of the first correlation information to indicate a correlation between the pulse ratio and the first reproduction quality. That is, referring to the correlation between the pulse ratio and the first reproduction quality indicated by the first correlation information, the pulse ratio compatible much better with the first reference is detected as the optimum ratio. Then, on the basis of the detected optimum ratio, with the aid of the operation of the second controlling device, the top pulse and the middle pulse are controlled so as to provide the optimum ratio, so that the recording device is controlled to control the laser power to thereby irradiate the laser beam.

Thereby, in the information record apparatus in which the laser beam is irradiated with shifting the top pulse and the middle pulse as appropriate, the optimum pulse can be advantageously detected. Furthermore, the optimum ratio can be advantageously detected regardless of a variation among information record apparatuses or a variation among information record media, since the optimum ratio is detected on the basis of the correlation between the pulse ratio and the reproduction quality of the pre-information actually recorded. Therefore, according to the information record information of the present invention, the record information can be recorded on the basis of this optimum ratio. Furthermore, it is possible to improve the reproduction quality of the record information recorded as such.

Incidentally, in the conventional information record apparatus, the record information is recorded by irradiating a laser beam whose power is varied depending on the predetermined pulse ratio. For this, the reproduction quality depends on the optimum power detected by an OPC (Optimum Power Control) or the like. Especially in the OPC or the like, the optimum power is detected so that an asymmetry or jitter value of the record information, which is an example of the reproduction quality, becomes a suitable state. Thereby, other reproduction qualities (e.g. the first reproduction quality of the pre-information and so on) may be deteriorated. In the information record apparatus of the present invention, however, the optimum ratio is detected so that the reproduction quality of the record information becomes the suitable condition (in particular, so that the first reproduction quality of the pre-information meets the first reference). Thereby, it is possible to improve the reproduction quality in comparison with the reproduction quality of the record information recorded by the conventional information record apparatus.

Consequently, according to the information record apparatus of the present invention, the appropriate pulse ratio is advantageously detected as the optimum ratio. Accompanying with this, the record information is advantageously recorded into the information record medium.

In an aspect of the e information record apparatus of the present invention, the apparatus further includes: a first writing device for writing a first test information for a test recording into the information record medium, with varying the laser power and varying the driving pulse corresponding to the varied laser power in accordance with the predetermined pulse ratio; an optimum power detecting device for detecting the laser power, as an optimum power, at which a second reproduction quality that is a reproduction quality of the first test information meets a second reference (a second standard), by reproducing the first test information; a second writing device for writing a second test information for a test recording into the information record medium, with carrying the pulse ratio of the driving pulse corresponding to the optimum power; and a generating device for measuring the first reproduction quality of the pre-information recorded in advance in a record area where the second test information is written, and generating the first correlation information on the basis of the measured first reproduction quality and the pulse ratio corresponding to the measured first reproduction quality.

According to this aspect, with the aid of the operation of the first writing device, like as a so-called OPC operation, the first test information is recorded with varying the laser power (i.e. varying sequentially by a predetermined amount, or continuously by predetermined proportion) by varying the driving pulse having a predetermined pulse ratio. After then, the optimum power is detected by reproducing the first test information with the aid of the operation of the optimum power detecting device. Then, with the aid of the operation of the second writing device, the laser power is set to be the optimum power, and then the second test information is recorded with varying the pulse ratio as appropriate. The first correlation information is generated by reproducing the second test information, with the aid of the operation of the generating device. That is, it is possible to generate the first correlation information indicating a relationship between the pulse ratio and the reproduction quality of the second test information recorded with varying the pulse ratio. Therefore, the optimum ratio can be advantageously detected, on the basis of the generated first correlation information.

In an aspect of the information record apparatus having the first writing device as mentioned above, the optimum power detecting device may detect the laser power, as the optimum power, at which at least one of asymmetry and a jitter value as the second reproduction quality meets the second reference.

In this arrangement, it is possible to detect the optimum power advantageously like as an usual OPC (Optimum Power Control).

In another aspect of the information record apparatus of the present invention, the information record apparatus further includes: a third writing device for writing a third test information for a test recording into the information record medium, with varying the laser power and the pulse ratio of the driving pulse corresponding to the varied laser power; and a generating device for measuring the first reproduction quality of the pre-information recorded in advance in a record area where the third test information is written, and generating the first correlation information on the basis of the measured first reproduction quality and the varied pulse ratio.

According to this aspect, it is possible to advantageously generate the first correlation information by recording the third test information with varying the driving pulse to vary the laser power stepwisely or continuously, and with varying the pulse ratio of the driving pulse corresponding to the laser power stepwisely and continuously (more preferably, varying the pulse ratio depending on the situation). Thereby, the optimum ratio is detected in a further advantageous manner, on the basis of the generated first correlation information and the like.

Incidentally, the first test information, the second test information and the third test information, which are described in the present invention, may be the same information or may be different from each other. In short, they are representatives of information different, in their format, from the record information including usual contents data and the like.

In an aspect of the information record apparatus having the third writing device as mentioned above, the optimum ratio detecting device may further comprise a judging device for judging whether or not the first reproduction quality of the pre-information recorded in advance in the record area where the third test information is written meets the first reference, and the third writing device may write the third test information with varying the pulse ratio, in a case that the judging device judges that the first reproduction quality does not meet the first reference.

In this arrangement, if the reproduction quality of the pre-information recorded in advance in the record area where the third test information is recorded with the aid of the laser beam corresponding to a certain pulse ratio meets the first reference, this certain pulse ratio can be detected as the optimum ratio. On the other hand, if the reproduction quality of the pre-information recorded in advance in the record area where the third test information is recorded with the aid of the laser beam corresponding to a certain pulse ratio does not meet the first reference, the pulse ratio is changed, and then the third test information is recorded again with the aid of the laser beam corresponding to the changed pulse ratio, and then a judgement is made on whether or not the reproduction quality of the pre-information recorded in advance in the record area where the third test information is recorded again meet the first reference. Therefore, the optimum ratio can be detected efficiently, without any wasteful operation for changing the pulse ratio.

In an aspect of the information record apparatus having the generating device as mentioned above, the recording device may record the generated first correlation information into the information record medium.

In this arrangement, the first correlation information once generated can be also used continuously after then. Therefore, it is possible to omit an operation of generating the first correlation information again, when the optimum ratio is detected again.

Particularly, the optimum ratio can be advantageously detected as mentioned above, even in the case that the information record medium is ejected from the information record apparatus and then loaded into a new information record apparatus, since the first correlation information is recorded in the information record medium itself.

In an aspect of the information record apparatus having the generating device as mentioned above, the apparatus may further comprises a storing device for storing the generated first correlation information.

In this arrangement, the first correlation information once generated can be also used continuously after then. Therefore, it is possible to omit an operation of generating the first correlation information again, when the optimum ratio is detected again.

Particularly, the optimum ratio can be detected on the basis of the first correlation information, even in the case that the record information is recorded in one information record medium different from other information record medium for which the first correlation information is generated, since the first correlation information is stored in the storing device provided with the information record apparatus itself. Particularly, it is advantageous for recordings relative to the information record medium of the same kind, the same quality and the same manufacturer.

In this case, the first correlation information is preferably stored with a classification by an identification number of the information record medium (e.g. manufacturer ID, disc ID and so on).

In another aspect of the information record apparatus of the present invention, the optimum ratio detecting device may detect the pulse ratio, as the optimum ratio, at which the first reproduction quality meets the first reference, in a case that a second reproduction quality that is a reproduction quality of record information recorded in a record area where the pre-information is recorded in advance meets a second reference.

In this arrangement, the optimum ratio can be detected taking into account not only the reproduction quality of the pre-information after the record information is recorded, but also the jitter value, asymmetry and the like as other reproduction qualities of the recording information. Therefore, it is possible to record the record information into the information record medium more advantageously.

In another aspect of the information record apparatus of the present invention, the record information can be recorded into the information record medium at a recording speed at least four times faster than a reference recording speed for recording the recording information.

According to this aspect, it is possible to effectively avoid the deterioration of the reproduction quality of the pre-information after the record information is recorded, which is a concern especially for the high speed recording (i.e. the recording at a recording speed at least four times faster (i.e. at least 4× recording speed) than the reference recording speed defined as 1× recording speed). Therefore, it is possible to improve the reproduction quality of the record information (in particular, the reproduction quality of the pre-information), even in the high speed recording, as well as in the low speed recording.

In an aspect of the information record apparatus capable of recording the record information at a higher recording speed as mentioned above, the optimum ratio detecting device may detect the pulse ratio, as the optimum ratio, at which the first reproduction quality meets the first reference, in a case that the record information is recorded at the recording speed at least four times faster than the reference recording speed, or the optimum ratio detecting device may detect the pulse ratio, as the optimum ratio, at which at least one of the jitter value and the asymmetry value as a second reproduction quality that is a reproduction quality of the record information meets a second reference, in a case that the record information is recorded at a recording speed below the recording speed at least four times faster than the reference recording speed.

In this arrangement, it is possible to distinguish reference for detecting the optimum ratio, for the recording at a relatively high recording speed of 4× or more, and for the recording at a relatively low recording speed under 4×. Therefore, in the case of high speed recording, it is possible to effectively avoid the deterioration of the reproduction quality of the pre-information after the record information is recorded, which is a concern especially for the high speed recording. On the other hand, in the low speed recording where the deterioration of the reproduction quality of the pre-information is not a serious problem, the jitter value or the asymmetry, each of which is another reproduction quality, can be maintained at a good condition. Therefore, as a whole, it is possible to advantageously improve the reproduction quality of the to-be-recorded record information, in both the high speed recording and the low speed recording.

In another aspect of the information record apparatus of the present invention, the pre-information is recorded in advance in the information record medium, by means of pre-pits formed on record tracks of the information record medium.

According to this aspect, in a DVD-R, DVD-RW and the like as an example of the information record medium, the optimum ratio can be appropriately detected, and it is thereby possible to improve advantageously the reproduction quality of the record information (in particular, the reproduction quality of the pre-information) to be recorded in the information record medium.

In an aspect of the information record apparatus for recording the record information into the information record medium where the pre-information is recorded by means of pre-pits as mentioned above, the apparatus may further comprises a measuring device for measuring the first reproduction quality on the basis of a maximum amplitude and a minimum amplitude of a push-pull signal generated by reproducing the pre-pits.

In this arrangement, on the basis of the push-pull signal, the first reproduction quality that is the reproduction quality of the pre-information can be measured appropriately. Therefore, the optimum ratio can be detected appropriately, on the basis of the correlation information generated based on the measured first reproduction quality.

In an aspect of the information record apparatus for recording the record information into the information record medium where the pre-information is recorded by means of pre-pits as mentioned above, the apparatus may further comprise a measuring device for measuring the first reproduction quality on the basis of a reproduction error rate of the pre-information obtained by reproducing the pre-pits.

In this arrangement, it is possible to measure appropriately the first reproduction quality that is the reproduction quality of the pre-information, on the basis of the error rate of the pre-information. Therefore, the optimum ratio can be detected appropriately, on the basis of the first correlation information generated based on the measured first reproduction quality.

In another aspect of the information record apparatus of the present invention, the pre-information is recorded in advance in the information record medium, by means of a modulation signal applied on record tracks of the information record medium wobbling in a predetermined cycle.

According to this aspect, in a DVD+R, DVD+RW, DVD-RAM and the like, each of which is an example of the information record medium, it is possible to improve advantageously the reproduction quality of the record information (in particular, the reproduction quality of the pre-information) to be recorded in the information record medium, since the optimum ratio can be detected appropriately.

(Information Record Method)

An information record method of the present invention is for recording record information into an information record medium where pre-information for controlling a recording of the record information is recorded in advance, by irradiating the information record medium with a laser beam whose power is varied depending on a driving pulse, said information record method comprising: a first controlling process of modifying the driving pulse into at least a top pulse and a middle pulse; an optimum ratio detecting process of detecting an optimum ratio that is a pulse ratio at which a first reproduction quality that is a reproduction quality of the pre-information meets a first reference, on the basis of at least a first correlation information to indicate a correlation between the first reproduction quality and a pulse ratio of the top pulse and the middle pulse; and a second controlling process of modifying the driving pulse in accordance with a pulse ratio corresponding to the optimum ratio.

According to the information record method of the present invention, various advantages can be obtained similarly to the information record apparatus of the present invention mentioned above.

Incidentally, the information record method of the present invention can take various aspects, corresponding to various aspects of the information record apparatus of the present invention mentioned above.

(Computer Program Product)

A computer program product of the present invention is a computer program product in a computer-readable medium for tangibly embodying a program of instructions executable by a computer in the information record apparatus of the present invention to make the computer function as at least one of the recording device, the first controlling device, the optimum ratio detecting device and the second controlling device.

According to the computer program product of the present invention, the information record apparatus of the present invention mentioned above may be embodied relatively easily, by reading and running the computer program product from a record medium, such as a ROM, a CD-ROM, a DVD-ROM, a hard disk and so on, storing the computer program therein/thereon, or by downloading the computer program product to the computer via the communication device and running it.

Incidentally, the computer program product may take various aspects, corresponding to various aspects of the information record apparatus of the present invention mentioned above.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

Embodiments of the present invention will now be discussed, with reference to drawings.

Figure 1:
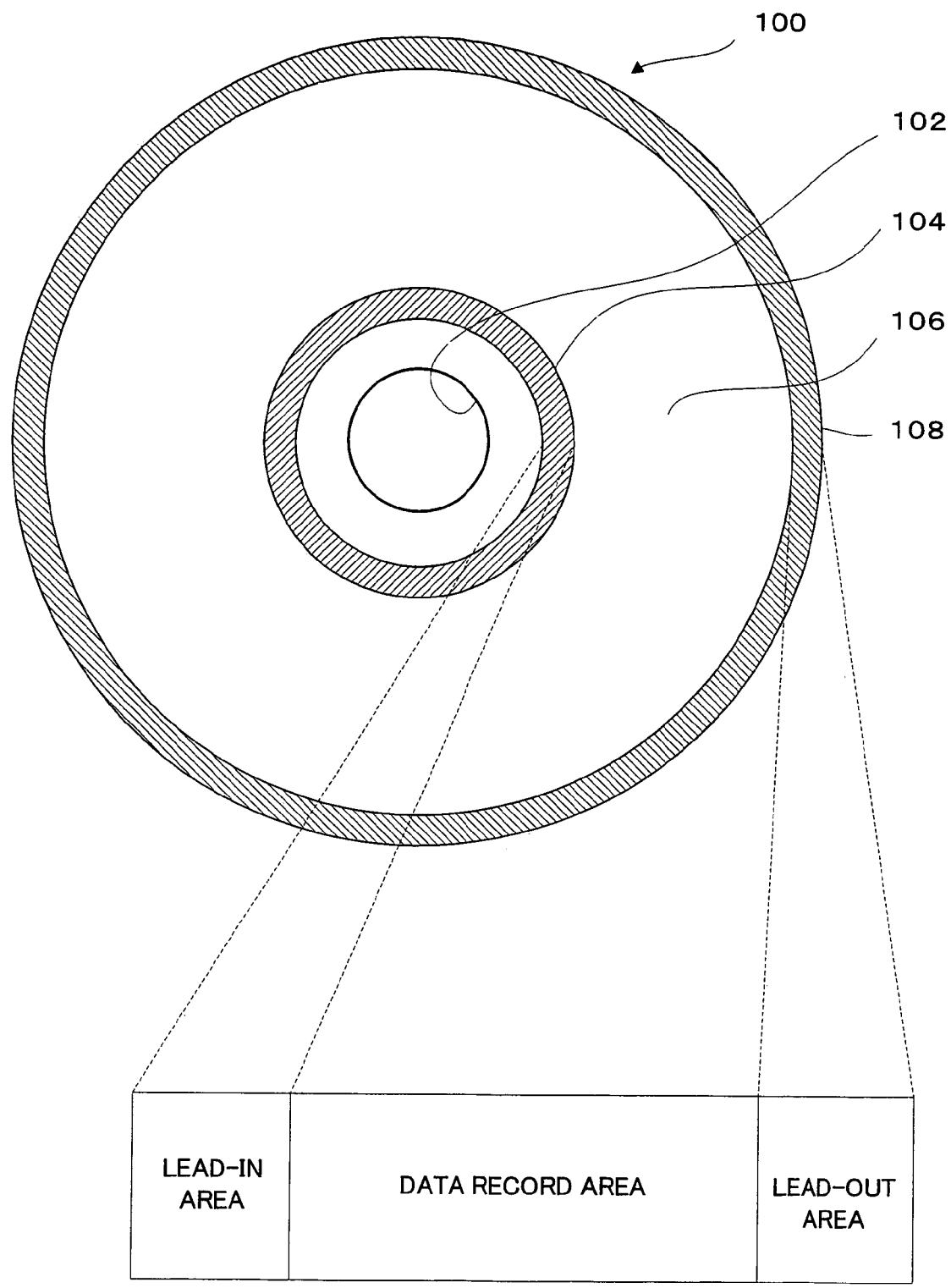
FIG. 1 shows a fundamental structure of an optical disc as an example of the information record medium used in an example of the information record apparatus according to the present invention; a general plan view of the optical disc having a plurality of areas is depicted in the upper portion of the figure.

Firstly, with reference to FIG. 1, an explanation will be made on an information record medium used in an embodiment of the information record apparatus according to the present invention. In this embodiment, the explanation is concerned with a recordable optical disc, as the information record medium. FIG. 1 illustrates a structure of the optical disc having a plurality of areas as a general plan view at the upper part of the figure, and an area structure in the radius direction as a conceptual view at the lower part of the figure associated with the upper part of the figure.

As shown in FIG. 1, the optical disc 100 may be embodied in various types of recordable disc allowing one or more recording (writing), such as a magneto-optic type, a phase change type and so on. Similarly to DVDs, the optical disc 100 has a lead-in area 104, a data record area 106 and a lead-out area 108, which are disposed concentrically around a center hole 102, in this order from an inner periphery to an outer periphery, on a record surface of a disc body having a diameter of about 12 cm. In each area, groove tracks and land tracks are alternately disposed for example spirally or concentrically around the center hole 102. These groove tracks (land tracks) may be wobbled. Furthermore, pre-pits may be formed in one or both of these groove and land tracks. Incidentally, this invention is not limited to the optical disc having three areas as mentioned above. For example, even if the lead-in area 104 and/or the lead-out area 108 do/does not exist, it is possible to construct a file structure as explained below. Furthermore, the lead-in area 104 and/or the lead-out area 108 may be further fragmented.

Embodiment of Information Record Apparatus

Now, with reference to FIG. 2 to FIG. 16, an explanation will be made on an embodiment of the information record apparatus according to the present invention.

(1) Fundamental Structure

Figure 2:
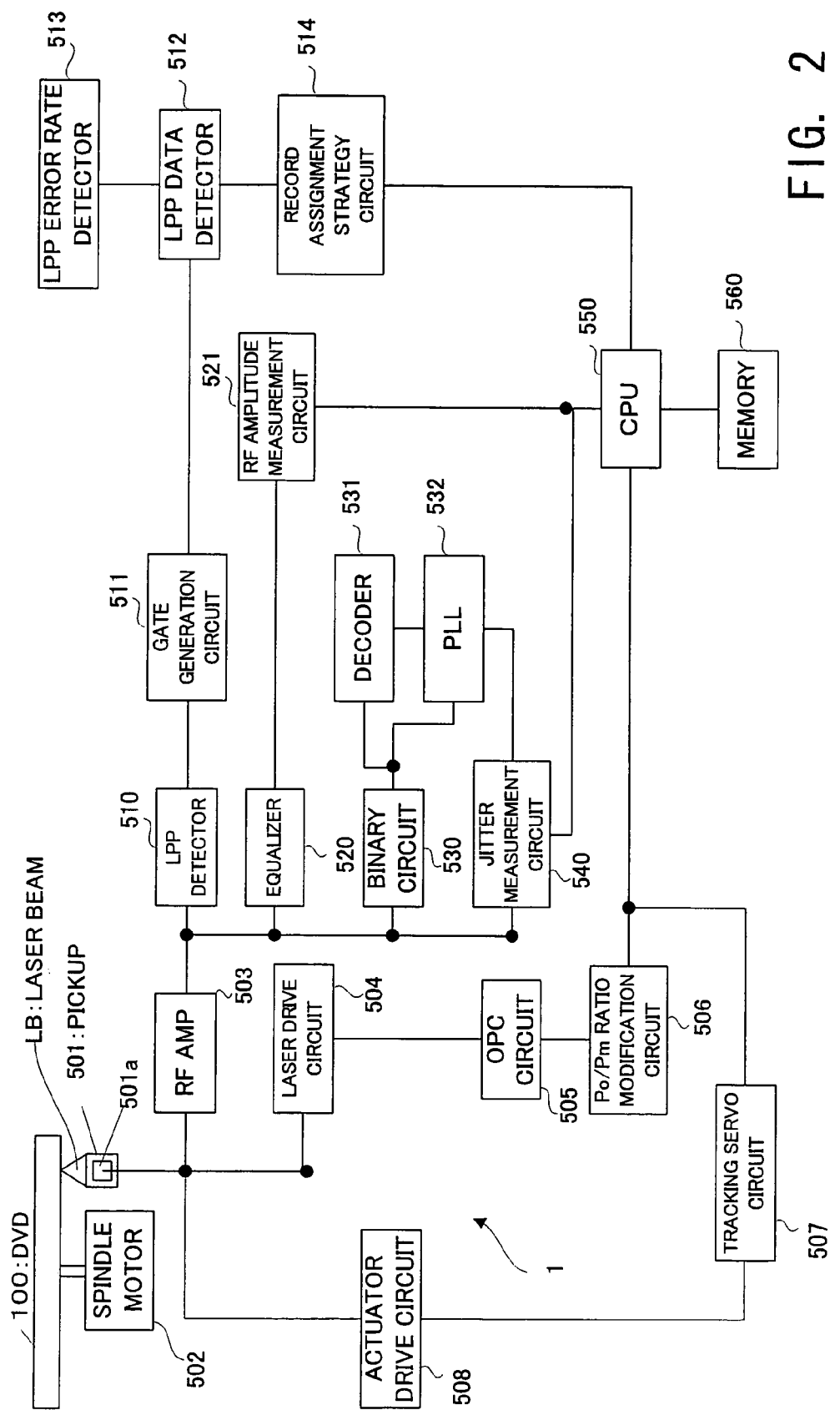
FIG. 2 is a block diagram conceptually illustrating a fundamental structure of an example of the information record apparatus according to the present invention.

Firstly, with reference to FIG. 2, a fundamental structure of this embodiment of the information record apparatus will be explained. FIG. 2 conceptually illustrates the fundamental structure of the embodiment of the information record apparatus in a block diagram.

As shown in FIG. 2, the information record apparatus 1 of this embodiment is provided with: an optical pickup 501; a spindle motor 502; an RF (Radio Frequency) amplifier 503; a laser drive circuit 504; an OPC (Optimum Power Control) circuit 505; a Po/Pm ratio modification circuit 506; a tracking servo circuit 507; an actuator drive circuit 508; an LPP (Land Pre-Pit) detector 510; a GATE generation circuit 511; an LPP data detector 512; an LPP error rate detector 513; a recording assign strategy detector 514; an equalizer 520; an RF amplitude measurement circuit 521; a binary circuit 530; a decoder 531; a PLL (Phase Locked Loop) 532; a jitter measurement circuit 540; a CPU 550; and a memory 560.

The optical pickup 501 is used for a recording or reproduction relative to the optical disc 100. The optical pickup 501 is made of a semiconductor laser device 501a, various lenses, actuators and so on, although these lenses and actuator are not shown in the figure. The semiconductor laser device 501a is an example of the "recording device" according to the present invention, for irradiating the optical disc 100 with a light beam such as a laser beam LB, which is modulated to the first power as a reading light for the reproduction purpose, or to the second power as a writing light for the recording purpose. Such a power modulation of the laser beam LB is performed under control of the laser drive circuit 504 as an example of the "first control device" and the "second control device" as mentioned below. More specifically, the laser beam LB is irradiated at a predetermined laser power by driving the semiconductor laser device 501a with a driving pulse defined by a predetermined pulse strategy. Furthermore, the optical pickup 501 is adapted to move in a radius direction of the optical disc 100, by an actuator, slider and so on driven by a servo circuit (not shown).

The spindle motor 502 is adapted to rotate the optical disc 100 at a predetermined speed under spindle servo control of the servo circuit (not shown) or the like.

The RF amplifier 503 amplifies a signal outputted from a PD (Photo Detector) (not shown) which receives reflection light of the laser beam LB irradiated from the semiconductor laser device 501a, and outputs the amplified signal. Specifically, an RF signal (or an LPP signal, wobble signal and so on) as the reading signal is outputted to the LPP detector 510, the equalizer 520, the binary circuit 530 or the jitter measurement circuit 540.

The laser drive circuit 504 is an example of the "first control device" and the "second control device". When an OPC processing is performed, the laser drive circuit 504 drives the semiconductor laser disposed in the optical pickup 501 in order to detect the optimum laser power with the aid of recording or reproducing an OPC pattern (mentioned below). When the data is recorded, the laser drive circuit 504 is adapted to then drive the semiconductor laser in the optical pickup 501 at the optimum laser power detected by the OPC processing. During this data recording, the optimum laser power is modulated depending on the record data.

The OPC circuit 505 is adapted to output a signal to indicate the OPC pattern to the laser drive circuit 504, when the OPC pattern is recorded during the OPC processing before the recording operation. Incidentally, the OPC processing will be explained later in detail (see FIG. 6 and the like).

The Po/Pm ratio modification circuit 506 is adapted to modify a pulse ratio (e.g. Po/Pm ratio) of a driving pulse to drive the semiconductor laser device 501a, in order to modify the power of the laser beam LB irradiated from the semiconductor laser device 501a. Specifically, an instruction to modify the Po/Pm ratio, which is a ratio of peak values of a top pulse (Po) and a middle pulse (Pm) of the driving pulse, is outputted to the laser drive circuit 504, and thereby the driving pulse to drive the semiconductor laser device 501a in the optical pickup 501 is controlled to modify the power of the laser beam LB.

Figure 3:
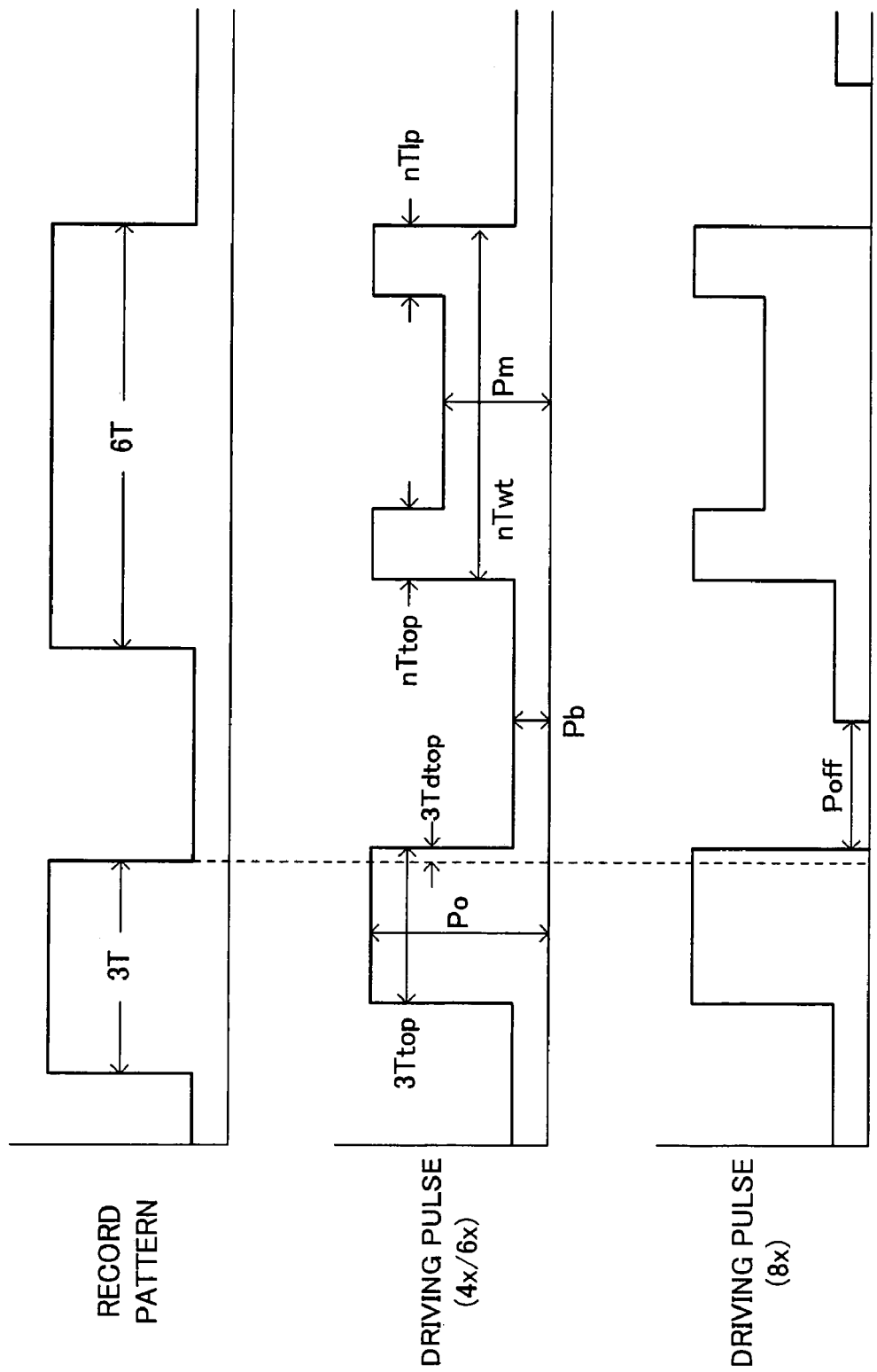
FIG. 3 is a timing chart conceptually illustrating pulses along each time axis, with regard to the laser beam LB irradiated from the information record apparatus in the example for the data recording, and record patterns (or record mark) actually recorded, respectively.

Now, an explanation will be made on the driving pulse to irradiate the laser beam LB, with reference to FIG. 3. FIG. 3 illustrates graphs conceptually showing the driving pulse to drive the laser beam LB oscillated during the data recording, and showing the record pattern actually recorded.

The recording operation relative to the optical disc 100 can be performed with a combination of 3T to 11T and 14T recording patterns, if the disc is a DVD-R/RW or the like, for example. Then, depending on the combination of the recording patterns, a desired data is recorded onto the optical disc 100, so that a series of contents data is formed.

When these recording patterns are recorded, a waveform of the driving pulse to irradiate the laser beam LB is controlled so as to be a predetermined form (e.g. a form having a predetermined peak value, duty ratio and so on) on the basis of the pulse strategy, for example with the aid of the laser drive circuit 504, as shown in FIG. 3. In FIG. 3, a combination of 3T recording pattern and 6T recording pattern is shown as a specific example of the combination of the recording patterns. A waveform illustrated at the topmost part of FIG. 3 is representative of the recording pattern actually recorded onto the optical disc 100.

When these recording patterns are recorded at a 4× or 6× recording speed for example, the laser beam LB is irradiated on the basis of the driving pulse having a waveform illustrated at the mid part of FIG. 3. Specifically, when 3T recording pattern, which is a relatively short record pattern, is recorded, on the basis of the driving pulse having a top pulse form whose peak value is Po, the laser beam LB is irradiated at a laser power corresponding to the driving pulse. That is, a record mark (or pits) of 3T pattern is formed with the aid of the laser beam LB irradiated on the basis of the driving pulse whose peak value is "Po" and whose pulse width is "3Ttop". On the other hand, when 6T recording pattern, which is a relatively long record pattern, is recorded, the laser beam LB is irradiated at a laser power corresponding to the driving pulse as illustrated at the lower part of FIG. 3. That is, a record mark (or pits) of 6T recording pattern is formed with the aid of the laser beam LB irradiated on the basis of the driving pulse obtained by combining, as illustrated at the lower part of FIG. 3, (i) a pulse whose peak value is "Po" and whose pulse width is "nTtop", (ii) a pulse whose peak value is "Pm" and whose pulse width is "nTwt-nTtop-nTlp", and (iii) a pulse whose value is "Po" and whose pulse width is "nTlp". Such a driving pulse waveform may be defined by a pulse strategy for example. On the basis of the pulse strategy, the driving pulse is supplied to the semiconductor laser device 501a in the optical pickup 501 for example with the aid of the operation of the laser drive circuit 504, so that the laser beam LB is actually oscillated.

Similarly, when recording patterns are recorded at still faster 8× recording speed, the laser beam LB is irradiated on the basis of the driving pulse having a top pulse form when a relatively short record pattern is recorded, and the laser beam LB is irradiated on the basis of the driving pulse for which the top pulse and the middle pulse are modified as appropriate when a relatively long record pattern is recorded.

Figure 9:
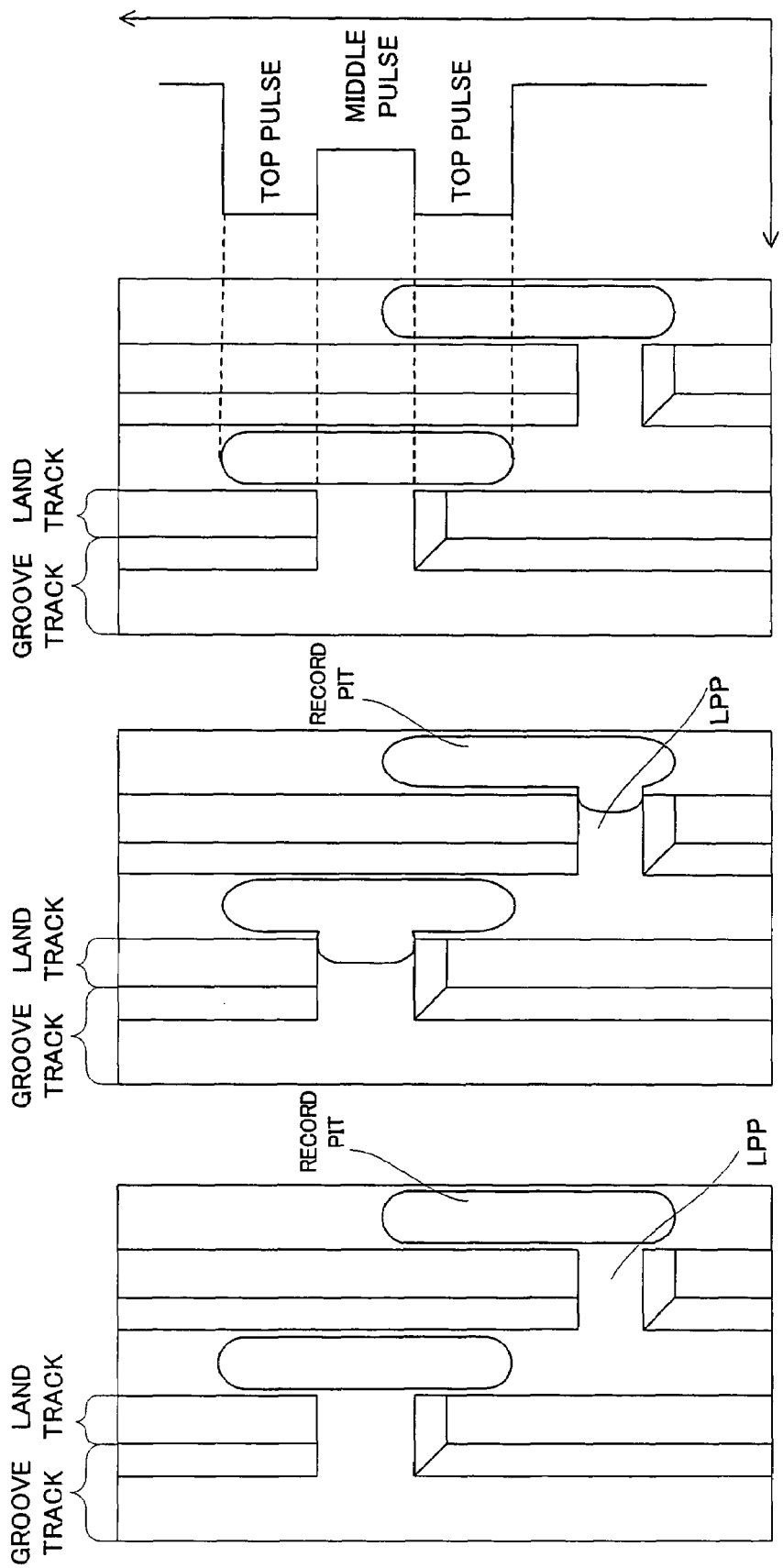
FIG. 9 is a perspective view conceptually illustrating various shapes of the record mark formed in various recordings including a high speed recording and a low speed recording.

Thus, controlling the driving pulse waveform to irradiate the laser beam LB makes it possible to form the record pattern (otherwise record mark or record pits) having the appropriate form onto the optical disc 100 (see pit form shown in FIG. 9(*a*)), even in the case that the recording pattern is recorded at a relatively high speed. The Po/Pm modification circuit 506 shown in FIG. 2 is adapted to freely modify a ratio of the peak value Po of the top pulse shown in FIG. 3 relative to the peak value Pm of the middle pulse (i.e. Po/Pm ratio).

During an interval between the 3T recording pattern and the 6T recording pattern, the irradiation of the laser beam LB is preferably continued at approximately the reproduction laser power Pb, without stopping the irradiation of the laser beam LB (i.e. without making the laser power to "0"). In this case, the reproduction laser power Pb is preferably decreased as much as possible to minimize the influence on the record area onto which the laser beam LB is irradiated. However, the laser beam LB is preferably irradiated at least with a minimum power sufficient to track the record tracks.

Again in FIG. 2, the tracking servo circuit 507 is adapted to detect various servo signals such as a tracking error signal and so on from the reading signal supplied from the optical pickup 501. These various servo signals are adapted to be outputted to the actuator drive circuit 508 or the spindle motor 502.

The actuator drive circuit 508 is adapted to control the movement of the optical pickup 501 in the radius direction or rotate direction of the optical disc 100, on the basis of various servo signals outputted from the tracking servo circuit 507. Then, with the aid of the optical pickup 501 whose movement is controlled by the actuator drive circuit 507, a desired record position on the optical disc 100 is irradiated with the laser beam LB, so that various data can be recorded.

The LPP detector 510 is adapted to detect a push-pull signal indicating the LPP signal, on the basis of the output signal corresponding to an amount of the light received from the RF amplifier 503 as the detector for receiving the reflection beam disposed in the optical pickup 501. In this case, in order to detect the push-pull signal, the photo detector of the optical pickup 501 is preferably adapted to receive the reflection beam of the laser beam LB, over a plurality of areas such as areas divided into two or four.

Incidentally, the LPP is a specific example of the "pre-information" according to the present invention, a pit formed on the recording track (land track in particular) on a DVD-R/RW and the like as a specific example of the optical disc 100. The LPP may be used for defining an address position on the optical disc 100, or for generating a recording clock signal during the data recording.

The GATE generation circuit 511 is adapted to generate a gate signal to detect the LPP data. Specifically, the gate signal is generated for a wobble on which the LPP is formed, and thereby the LPP data can be detected and noise in the LPP data can be effectively eliminated. It is needless to say that the LPP data can be detected by means of the gate signal generated by detecting the wobble signal.

The LPP data detector 512 is adapted to detect the LPP data from the LPP signal outputted from the LPP detector 510, on the basis of the gate signal generated by the GATE generation circuit 511. For example, it may be adapted to detect address information to indicate address positions on the optical disc 100 or clock information to indicate clocks during the recording operation, from the LPP data.

The LPP error rate detector 513 is adapted to detect an error rate of the LPP data detected at the LPP data detector 512. This error rate may be referred to as BERLPPa (Block Error Rate LPP after), indicating the same value as the AR property.

Now, a brief explanation is made on the AR property. The optical pickup 501 has a bipartition photo detector circuit (not shown), and thereby can generate push-pull signals respectively from divided reproduction signals. In this case, from among the push-pull signal components, a ratio of the maximum amplitude relative to the minimum amplitude in a signal component in a direction of a groove track is referred to as an AR property. For example, the maximum and minimum amplitudes of these reproduction signals can be recognized and thereby the AR property can be calculated, by overlapping reproduction signals on an oscilloscope when the LPPs formed on a DVD-R/RW are reproduced. In the actual information record apparatus 1, however, calculating the error rate of the LPP data makes it possible to provide a recognition almost equally in the measurement of the AR property, and provide almost the same operation.

The record assignment strategy detector 514 is adapted to detect the pulse strategy recorded as default in the LPP, from the LPP data detected by the LPP data detector 512. Then, the laser beam LB is irradiated on the basis of the driving pulse as shown in FIG. 3 defined by the detected strategy.

The equalizer 520 is adapted to perform a predetermined filtering (or signal processing) of the RF signals and the like detected by the RF amplifier 503 and output the signal after filtering (e.g. an envelope detection and so on) to the RF amplitude measurement circuit 521.

The RF amplitude measurement circuit 521 is adapted to detect a peak value and a bottom value of the envelop detection of the RF signal as the output signal from the RF amplifier 503, in order to detect the optimum laser power, under control of the CPU 550. The RF amplitude measurement circuit 521 may include an A/D converter for example.

The binary circuit 530 is adapted to generate a binary signal from the RF signal or the like detected by the RF amplifier 503. Specifically, a pulse line is generated for example from the detected RF signal and the like. Then, it is adapted to output the binarized signal to the decoder 531 and the PLL 532, respectively.

The decoder 531 is adapted to demodulate the RF signal binarized at the binary circuit 530, and output the reproduction data or buffer to the external via an external output interface. Then, predetermined contents are reproduced and outputted at an external output device (e.g. a display device such as an LCD or a PDP, otherwise a speaker, and so on) connected to the external output interface.

The PLL 532 is adapted to generate the clock signal as a reference during the recording operation, on the basis of the binarized signal (a binarized LPP signal or wobble signal in particular) outputted from the binary circuit 530.

The jitter measurement circuit 540 is adapted to detect the jitter value from the RF signal detected by the RF amplifier 503.

In order to control an entire operation of the information record apparatus 1, the CPU 550 may receive data from the Po/Pm ratio modification circuit 506, the record assignment strategy detector 514, the RF amplitude measurement circuit 521, the jitter measurement circuit 540 and/or so on, and then starts the control operation. Then, on the basis of the received data, the CPU 550 outputs a system command to various devices of the information record apparatus 1, and thereby controls the entire information record apparatus 1. Usually, software for actuating the CPU 550 may be stored in a ROM and the like (not shown).

The memory 560 includes a semiconductor memory such as a RAM (Random Access Memory) or flash memory, and is adapted to record temporarily various data required for the operation of the information record apparatus 1. Furthermore, it may be adapted to record a correlation formula or the optimum record power Po, otherwise the optimum ratio and so on, as mentioned below.

Incidentally, in the information record apparatus 1 mentioned above, some components only required for this embodiment are selectively depicted for clarifying the features of the invention. However, it is needless to say that other components but the aforementioned components may be included.

Furthermore, the information record apparatus of this embodiment discussed with reference to FIG. 2 serves also as an embodiment of the information record reproduction apparatus. That is, the record information can be reproduced with the aid of the optical pickup 501 and the RF amplifier 503, and this embodiment includes a function as the information reproduction apparatus and a function as the information record reproduction apparatus.

(Operation Principle)

Now, with reference to FIG. 4 to FIG. 16, the operation of the information record apparatus 1 of this embodiment will be explained.

(1) General Recording Operation

Figure 4:
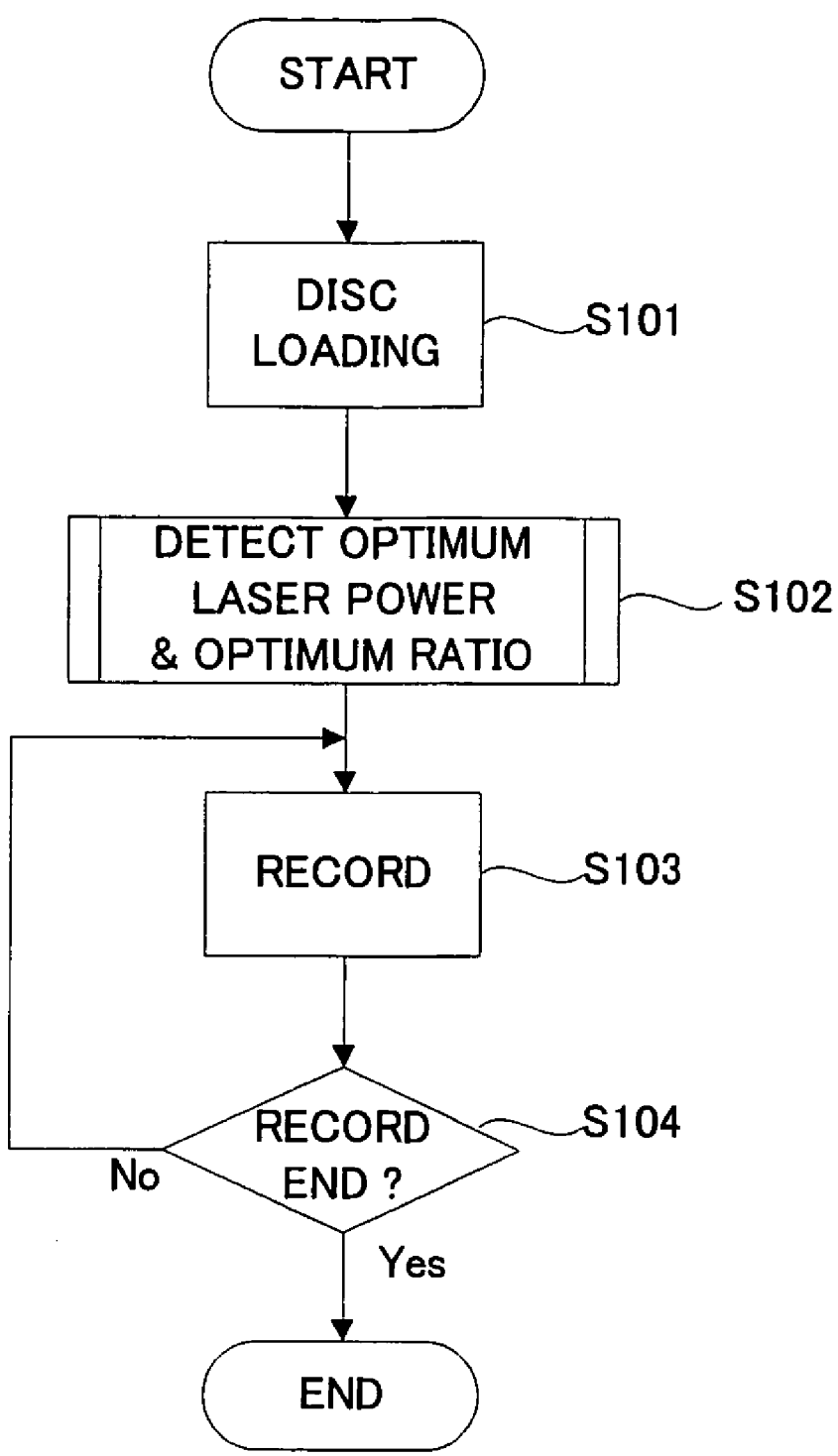
FIG. 4 is a flow chart conceptually showing a general flow of the recording operation in the example of the information recording apparatus.

Firstly, with reference to FIG. 4, an explanation will be made on an operational flow of the general recording operation when various data is recorded. FIG. 4 conceptually shows an operational flow of the general recording operation of the information record apparatus 1 of this embodiment.

As shown in FIG. 4, the optical disc 100 is firstly loaded into the information record apparatus (step S101). Then, under control of the CPU 550, the optical pickup 501 performs the seeking operation to obtain various management data (and/or various control data) required for the record processing. In particular, a predetermined pulse strategy (or pulse strategy defined as default) is obtained by reading the land pre-pit (LPP) in the lead-in area 104. On the basis of this management data, data is recorded onto the optical disc 100 via an external input interface or the like for example, under control of the CPU 550 and an instruction from an external input device or the like for example.

After this loading operation, the optimum laser power for the actual data recording and the optimum pulse ratio (i.e. Po/Pm as mentioned above) are detected (step S102). This detection of the optimum ratio will be discussed later in detail (see FIG. 5).

Then, the data to be recorded actually is recorded from a predetermined address position on the optical disc 100 (step S103). In this case, the laser power is changed during the irradiation of the laser beam LB, by modifying the driving pulse corresponding to the optimum laser power detected at step S102 with the optimum ratio detected at step S102. Then, the data is recorded mainly in the data record area 106 shown in FIG. 1.

Specifically, a DVD modulation (e.g. 8-16 modulation) is applied to the data to be recorded inputted via the external input interface or the like by the DVD modulator 370. A code for the data error correction, i.e. an ECC code, is added to the modulated data, for example, for every predetermined block unit (e.g. ECC block unit). Then, a desired laser beam LB is irradiated through the optical pickup 501, so that the modulated record data to which the ECC code is added is recorded as the record pit, the record mark or the record pattern on the optical disc 100.

Then, it is judged whether or not the recording is completed for all data (step S104). As a result of this judgement, if it is judged that the recording is completed for all data (step S104: Yes), the recording operation is directly terminated. In this case, it is possible to incorporate a finalization to maintain the compatibility with DVD-ROMs, or to eject the optical disc 100 from the information record apparatus 1.

Now, with reference to FIG. 5 to FIG. 15, an explanation will be made on the detection of the optimum laser power and the optimum pulse ratio at step S102 in FIG. 4. In the following explanation, the detection is focused on a specific example, as a first exemplary operation, in which the optimum laser power is detected in the OPC processing, and then the pulse ratio of the driving pulse corresponding to the optimum laser power is detected, and another specific example, as a second exemplary operation, in which the pulse ratio is detected at the same time of the OPC processing.

(2) First Exemplary Embodiment

Figure 5:
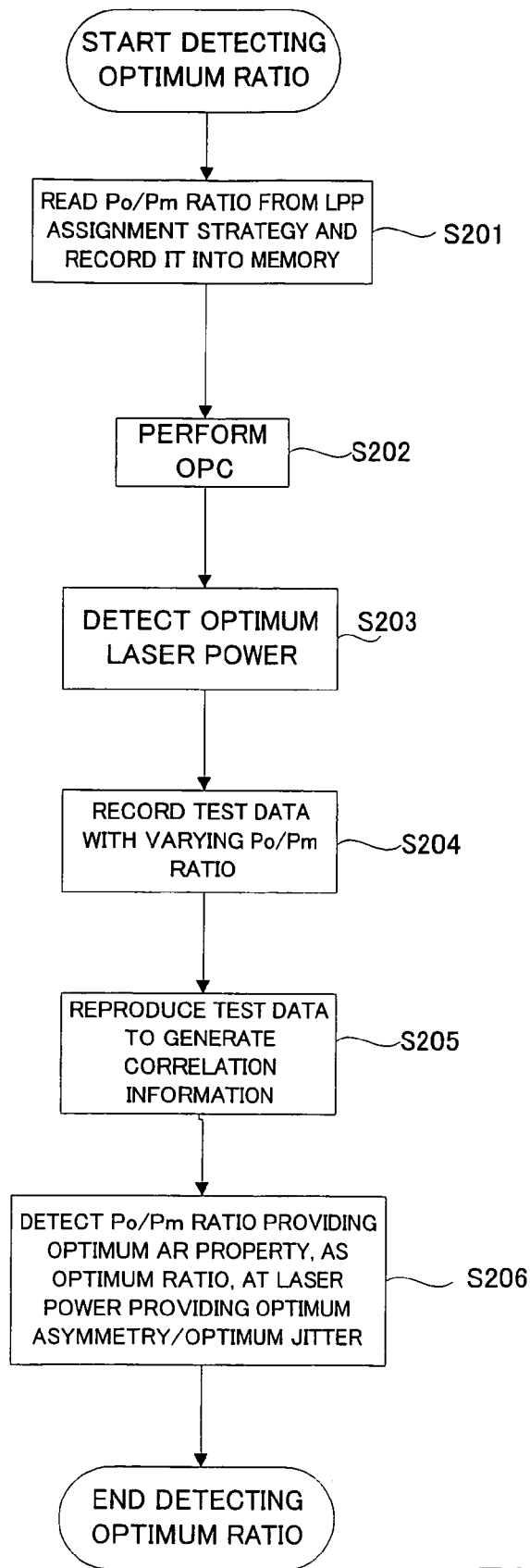
FIG. 5 is a flow chart conceptually showing detecting operation in the first exemplary operation in the example of the information record apparatus.

Firstly, with reference to FIG. 5 to FIG. 11, the first exemplary embodiment will be discussed. Now, a general flow of the first exemplary operation is explained with reference to FIG. 5, a more detail flow of the first exemplary operation will be explained with reference to other drawings if needed. FIG. 5 conceptually shows an operational flow of the detection in the first exemplary operation.

Incidentally, in the first exemplary operation, the optimum laser power is firstly detected in a so-called OPC, and then the optimum Po/Pm ratio is detected with modifying the Po/Pm ratio of the driving pulse corresponding to the optimum laser power as appropriate.

As shown in FIG. 5, the Po/Pm ratio (or pulse strategy) as default is firstly read from the LPP assignment strategy information and stored into the memory 560 (step S201). Specifically, the Po/Pm ratio as default is read from the LPP data with the aid of the operation of the record assignment strategy detector 514. In this case, if the pulse strategy as default is obtained during the operation of step S101 in FIG. 4, the operation of step S201 may be omitted.

Figure 6:
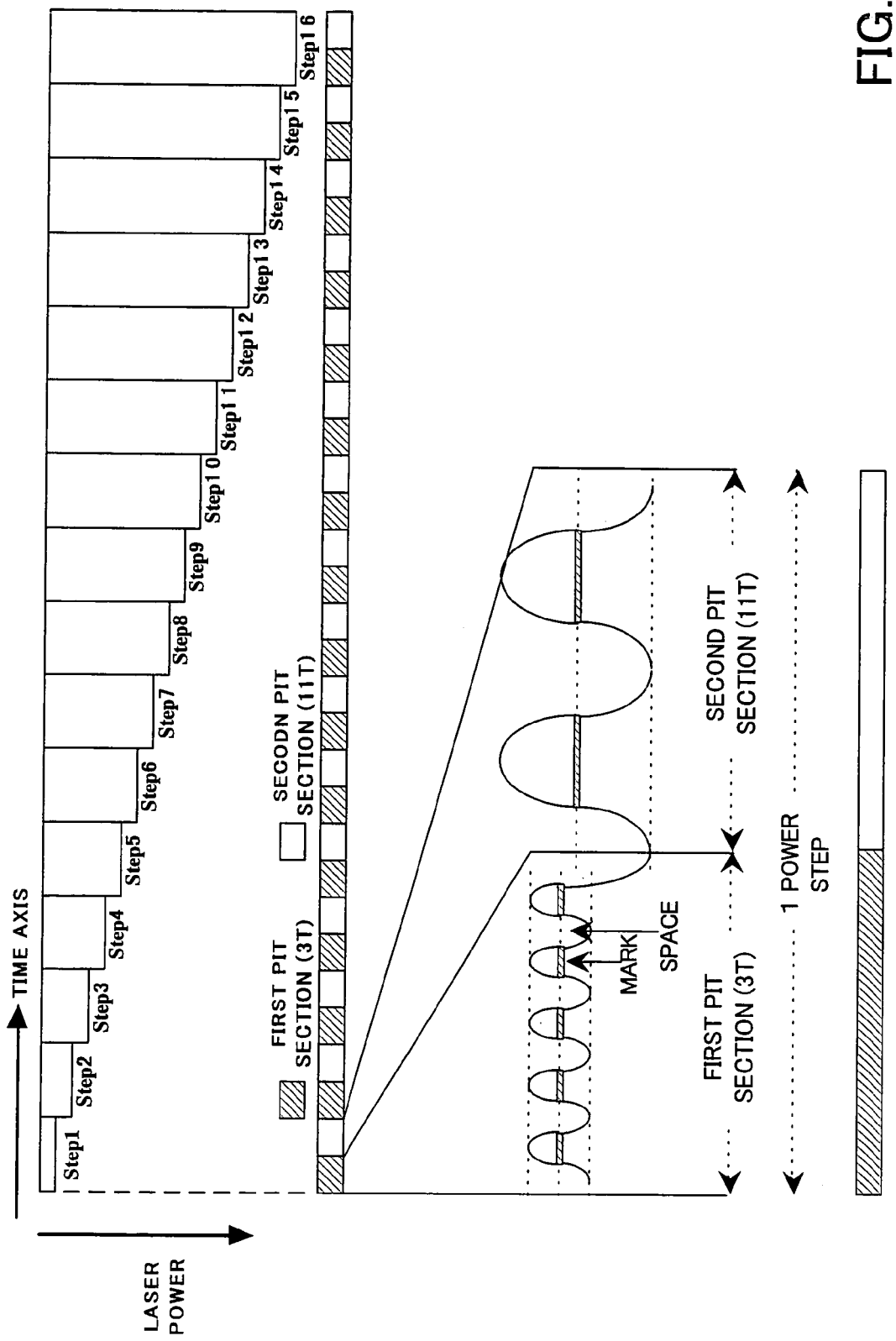
FIG. 6 is a timing chart schematically showing one OPC processing in a case of 16 power steps, in the operation of the example of the information record apparatus.

Then, the OPC processing is performed (step S202). Now, the OPC processing is discussed in detail with reference to FIG. 6. FIG. 6 shows a schematic timing chart to indicate one OPC processing in 16 power steps, in the operation of the information record apparatus of this embodiment.

Firstly, under control of the CPU 550, the optical pickup 501 as a specific example of "the first writing device or the third writing device" according to the present invention is placed to a PCA (Power Control Area) provided in the lead-in area 104 or the like on the optical disc 100. Then, the laser power is varied sequentially and stepwisely (e.g. 16 steps different from each other), so that a test signal such as an OPC pattern as a specific example of "the first test information or the third test information" according to the present invention is recorded in the PCA. Specifically, a test signal such as a reference OPC pattern as shown in FIG. 6 and generated by the OPC circuit 505 is recorded. The test signal may be a random pattern of 3T to 14T. Such an OPC pattern is generated according to a predetermined pulse strategy, under control of the CPU 550. In FIG. 6, there is shown as a specific example, an aspect of recording the OPC pattern including (i) the first pit range for recording a test signal of 3T pattern among the random patterns and (ii) the second pit range for recording a test signal of 11T pattern for every laser power stepwisely changed. Naturally, different OPC patterns may be used for every laser power stepwisely varied.

The laser drive circuit 504 drives the semiconductor laser in the optical pickup 501 to vary the laser power sequentially and stepwisely according to this OPC pattern. In this OPC processing, the OPC pattern is recorded with the aid of the laser beam LB irradiated on the basis of the driving pulse having a waveform defined by the Po/Pm ratio read at step S201 in FIG. 5.

Then, after completion of recording the OPC pattern in the PCA, the recorded part in the PCA (i.e. OPC pattern) is reproduced, under control of the CPU 550. Then, various reproduction quality is detected from the reproduced RF signal for every laser power stepwisely varied. For example, an asymmetry (or β value) may be detected from an RF peak value and an RF bottom value measured through the operation of the RF amplitude measurement circuit 521, or a jitter value may be detected from the jitter measurement circuit 540, or an AR property (or BERLPPa) may be detected through the operation of the LPP data detector 512 or the LPP error rate detector 513. Such detection of the reproduction quality is performed depending on the number of the recorded OPC pattern in one OPC processing, for every laser power stepwisely switched.

Figure 7:
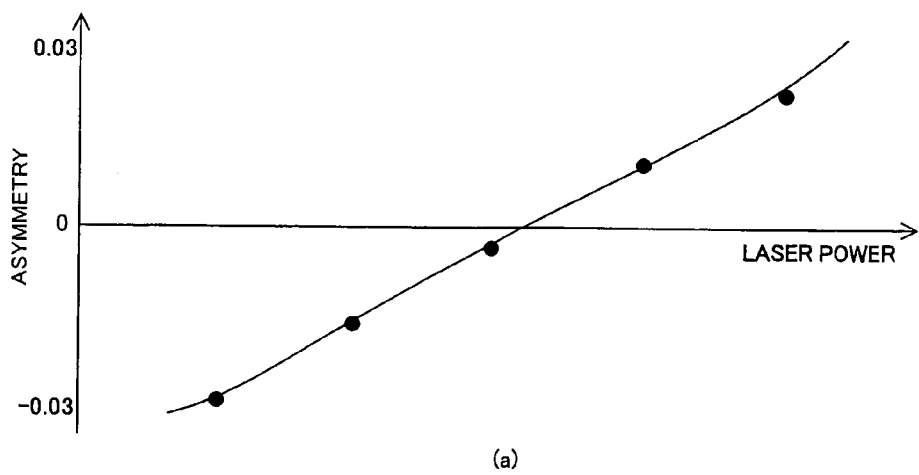
FIG. 7 shows graphs conceptually indicating correlations generated by the OPC, in the example of the information record apparatus.
Figure 7:
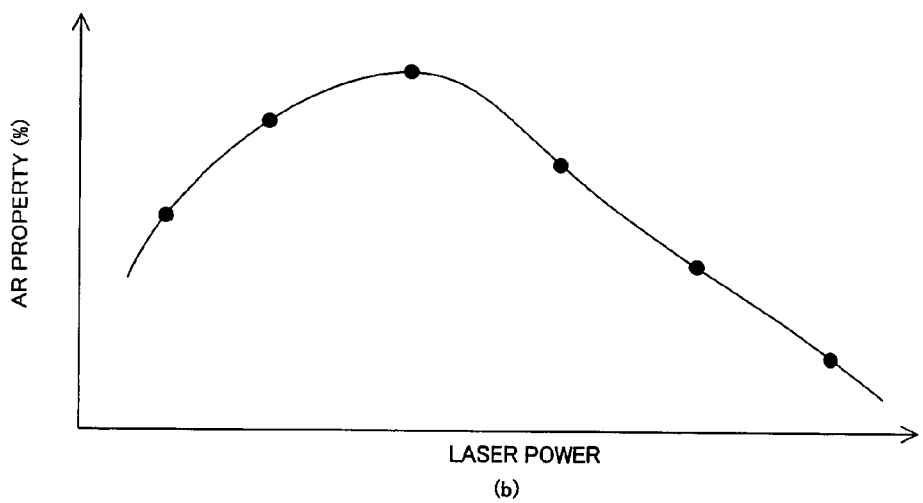
Figure 7:
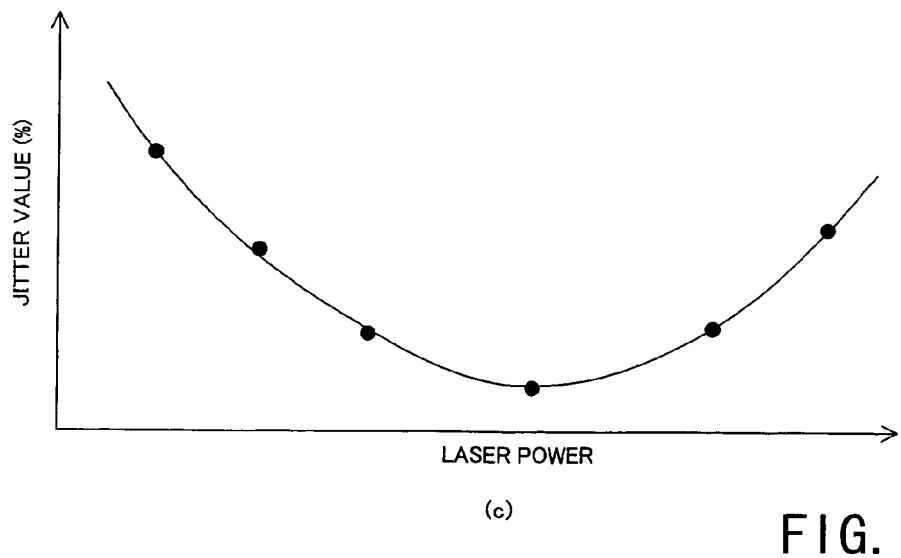

As the result, it is possible to generate correlation information (i.e. a specific example of "the second correlation information" according to the present invention) to indicate a relationship between the laser power sequentially and stepwisely varied and various reproduction quality of the OPC pattern recorded at the laser power, as shown in FIG. 7. FIG. 7 show graphs to conceptually indicate the correlation information generated through the OPC operation.

For example, in a graph in which the asymmetry is plotted as a vertical axis and the laser power is plotted as a horizontal axis, the correlation information as shown in FIG. 7(a) can be obtained by plotting asymmetry values obtained from the reproduction of the OPC pattern and lining an approximated curve over these values. Such an approximated curve can be generated by a statistic method or mathematical method such as least-square method.

Furthermore, also with regard to the AR property as another reproduction quality, the correlation information as shown in FIG. 7(b) can be generated. Also with regard to the jitter value as another reproduction quality, the correlation information as shown in FIG. 7(c) can be generated.

On the basis of such a correlation information, under control of the CPU 550 as a specific example of "the optimum power detecting device" according to the present invention, the optimum power is detected. In the OPC processing, the laser power capable of providing the optimum or suitable asymmetry or jitter value is preferably detected as the optimum laser power. For example, the laser power which provides the asymmetry value "0" may be detected as the optimum laser power, or the laser power which provides the minimum jitter value (or 8% or less) may be detected as the optimum laser power. That is, this "asymmetry value "0" condition or "jitter value 8% or less" condition corresponds to a specific example of the second reference according to the present invention. Naturally, the present invention is not limited to this detection, a laser power capable of providing allowable reproduction quality with reference to a standard of the optical disc 100 may be detected as the optimum laser power.

Incidentally, although graphs are used for the clarification of the explanation about the correlation information, it is needless to say that the optimum laser power may be detected actually without generating these graphs. That is, the optimum laser power may be detected through a mathematic calculation, depending on a relationship between the laser power obtained from the OPC pattern reproduction and various reproduction quality.

Again in FIG. 5, the optimum laser power is detected as a result of the OPC processing as mentioned above (step S203). Then, under control of the CPU 550, the optical pickup 501 as a specific example of "the second writing device or the third writing device" according to the present invention is positioned to a predetermined area to record test data for a test recording as a specific example of "the second test information or the third test information" according to the present invention, with modifying the Po/Pm ratio as appropriate (step S204). Specifically, a test data of 3T pattern is recorded in a predetermined area, with the Po/Pm ratio being incremented by 0.05 (i.e. 1.35, 1.40, 1.45, . . . 1.65 and so on), through the operation of the Po/Pm ratio modification circuit 506. Naturally, the Po/Pm ratio may be modified consecutively by a predetermined proportion, for example, 0.05 increments of the Po/Pm ratio for every recording of 5ECC block, instead of the stepwisely modification of the Po/Pm ratio by a predetermined increment. The laser power in this case is fixed to the optimum laser power detected at step S203.

Then, under control of the CPU 550 as a specific example of "the generating device" according to the present invention, the correlation information to indicate the correlation between the reproduction quality and the Po/Pm ratio is generated as a specific example of "the first correlation information" according to the present invention, by reproducing the test data recorded at step S204 (step S205). As mentioned above, it is preferable to measure the asymmetry, the jitter value and the AR property as the reproduction quality of the test data.

Figure 8:
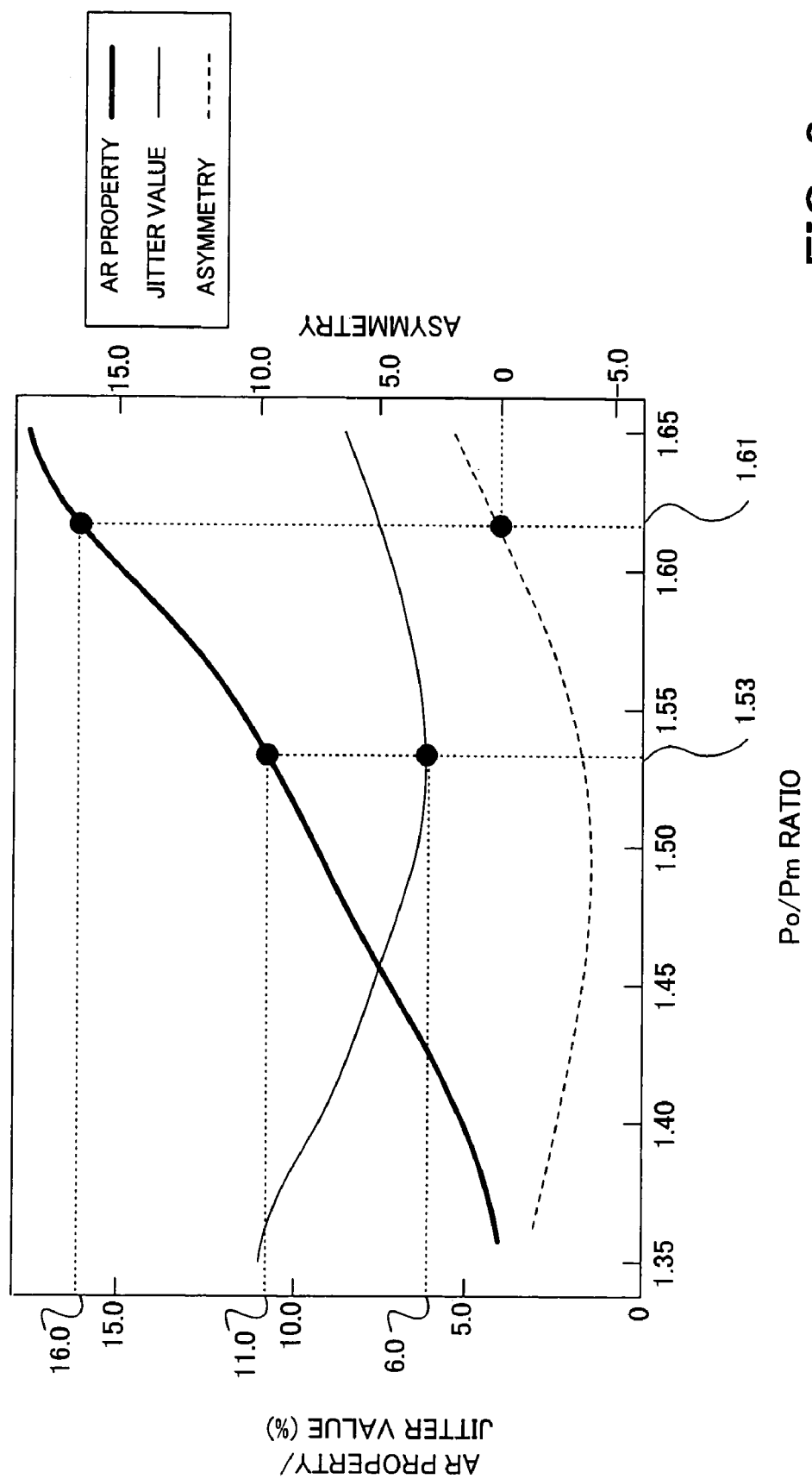
FIG. 8 is a graph conceptually showing correlation information to indicate a correlation between Po/Pm ratio and reproduction quality.

In this case, for example, the correlation information as shown in FIG. 8 may be generated. FIG. 8 is a graph conceptually showing a correlation between the reproduction quality and the Po/Pm ratio.

In a graph in which reproduction quality such as the asymmetry, the jitter value and the AR value are plotted as vertical axes, and the Po/Pm ratio is plotted as a horizontal axis, correlations as shown in FIG. 8 can be obtained, by plotting the asymmetry, the jitter value and the AR property obtained from the test data reproduction and lining these plotted points as approximated curves for each factor. These approximated curves may be generated by a mathematical or statistic method such as least-square method, as mentioned above.

Again in FIG. 5, under control of the CPU 550 as a specific example of "the optimum ratio detecting device" according to the present invention, the optimum Po/Pm ratio is detected, on the basis of the correlation information generated at step S205 (step S206). Specifically, a Po/Pm ratio which provides the optimum AR property at the laser power providing the optimum jitter value or the optimum asymmetry is detected as the optimum ratio. That is, the information record apparatus 1 of this embodiment is adapted to determine the optimum ratio, putting a priority on the AR property from among various reproduction qualities. Then, this "which provides the optimum AR property at the laser power providing the optimum jitter value or the optimum asymmetry" condition corresponds to "the first reference" according to the present invention. However, "which provides the optimum AR property" in this first exemplary operation means that the AR property indicates a good value (a preferable value) based on the standard of the optical disc 100. For example, if the optical disc 100 is a DVD-R, "the optimum AR property" indicates that the AR property achieves a value equals to or more than 15%. If the optical disc 100 is a DVD-RW, "the optimum AR property" may mean that the AR property achieves a value equals to or more than 10%. Similarly, "the optimum jitter value" means that the jitter value indicates a good value (a preferable value) based on the standard of the optical disc 100. For example, if the optical disc 100 is a DVD-RW, "the optimum jitter value" may mean that the jitter value achieves a value equals to or less than 8% (the lesser value is more preferable). Similarly, "the optimum asymmetry" means that the asymmetry indicates a good value (a preferable value) based on the standard of the optical disc 100. For example, if the optical disc 100 is a DVD-RW, "the optimum asymmetry" may mean the asymmetry achieves a value in a range from −5% to 15% (more preferably 0%).

This detection of the optimum ratio will be explained, with reference to the correlation information specifically shown in FIG. 8. As shown in the correlation information of FIG. 8, the Po/Pm ratio is "1.53", when the jitter value takes the minimum value (about 6% in FIG. 8). In this case, the AR property is "11%". This value is not a preferable value according to the standard and thereby the Po/Pm ratio "1.53" cannot be detected as the optimum ratio. On the other hand, the Po/Pm ratio is "1.61", when the asymmetry is "0%". In this case, the AR property is "16%". This value is a preferable value according to the standard and thereby the Po/Pm ratio "1.61" can be detected as the optimum ratio.

Incidentally, the Po/Pm ratio which provides the optimum AR property is detected, in the case that the jitter value takes the minimum, or the asymmetry is "0%". The present invention is not limited to this case. For example, it is possible to detect a Po/Pm ratio as the optimum Po/Pm ratio in the case that the jitter value takes a value 8% or less (i.e. the optimum value) or the asymmetry takes a value in a range from −5% to 15% (i.e. the optimum value). Furthermore, if needed, it is possible to detect a Po/Pm ratio, as the optimum ratio, which provides optimum ranges of both the jitter value and the AR property, but does not provide the optimum range of the asymmetry. Alternatively, it is possible to detect a Po/Pm ratio, as the optimum ratio, which provides optimum ranges of both the asymmetry and the AR property, but does not provide the optimum range of the jitter value. Alternatively, emphasizing a viewpoint of reducing the error rate of the LPP signal during the high speed recording, it is possible to detect a Po/Pm ratio, as the optimum ratio, which provides the optimum range of the AR property, even if the jitter value and the asymmetry are not in each optimum range. However, from a viewpoint of achieving more suitable reproduction quality (i.e. to record the data appropriately), it is preferable to detect a Po/Pm ratio, as the optimum ratio, which provides the optimum AR property when the jitter value takes the minimum or the asymmetry is "0%". Furthermore, it is preferable to detect a Po/Pm ratio, as the optimum ratio, which provides each optimum range of the asymmetry, the jitter value and the AR property, respectively.

Furthermore, it is possible to detect a Po/Pm ratio as the optimum ratio to achieve better reproduction quality by modifying the Po/Pm ratio within a wider range (e.g. a range less than 1.35, or a range more than 1.65, which are not shown in FIG. 8). The range for modifying the Po/Pm ratio may be predetermined as default, or may be appropriately determined with the aid of the information record apparatus 1, or by a user of the information record apparatus 1.

Furthermore, the correlation information as shown in FIG. 8 may be stored in the memory 560 as a specific example of "the storing device" according to the present invention, or may be recorded in a predetermined record area on the optical disc 100.

Thus, it is possible to obtain the reproduction quality recorded especially at a high recording speed, by detecting the optimum ratio particularly concerning abut the AR property, in addition to the jitter value and asymmetry which are important factors in the usual OPC processing. This is due to a difference between the recording pit formed on the optical disc 100 during the high speed recording and the recording pit formed on the optical disc 100 during the low speed recording. This difference of the recording pit will now be explained, with reference to FIG. 9. FIG. 9 conceptually illustrates various shapes of the recording pits formed respectively during the high speed recording and the low speed recording.

As shown in FIG. 9(a), during the low speed recording (specifically, the recording at approximately 1× or 2× recording speed), since the rotational speed of the optical disc 100 is relatively low, the irradiation time with the laser beam LB becomes longer than the high speed recording (specifically, the recording at circa 4× recording speed). Therefore, the record pit is formed in an appropriate pit form.

On the contrary, as shown in FIG. 9(b), since the rotational speed of the optical disc 100 is relatively high, the irradiation time with the laser beam LB becomes shorter than the low speed recording. Additionally, the power of the laser beam LB required for the recording increases, as the rotational speed of the optical disc 100 increases. Therefore, the record pit is formed not only on the groove track GT but also on the LPP. Thereby, the AR property as the reading property of the LPP is considerably deteriorated.

According to the information record apparatus 1 of this embodiment, however, it is possible to form the record pit in an appropriate form like as in the case of the low speed recording as in the case of the high speed recording, since the Po/Pm ratio of the laser beam LB is detected particularly concerning about the AR property as a reproduction quality. That is, it is possible to obtain the good reproduction quality (the AR property in particular) even in the case of the high speed recording. Particularly, it is more secure to effectively avoid the formation of the record mark on the LPP part as shown in FIG. 9(b), by irradiating with the laser beam on the basis of the driving pulse as shown at the right hand in FIG. 9(c) (i.e. the driving pulse having a top pulse and a middle pulse). That is, as shown at the left hand in FIG. 9(c), it is possible to form the record mark having an appropriate shape the same as in the low speed recording, even if the mark is formed with the laser beam LB at the laser power required for the high speed recording. If the driving pulse does not have the middle pulse (i.e. has only the top pulse), the mid portion of the record mark is bulged or swelled out to extend over the LPP. However, if the laser beam LB is irradiated on the basis of the driving pulse corresponding to the middle pulse as shown in FIG. 9(c), the laser power during a period corresponding to the middle pulse can be relatively reduced to avoid the bulge of the record mark. Furthermore, it is possible to obtain much better reproduction quality, because the pulse ratio is detected as the optimum ratio so as to obtain a good (or optimum) asymmetry or a jitter value in addition to a good (or optimum) AR property. That is, it is possible to further improve the reproduction quality of the recorded data, in comparison with the conventional information record apparatus.

Figure 10:
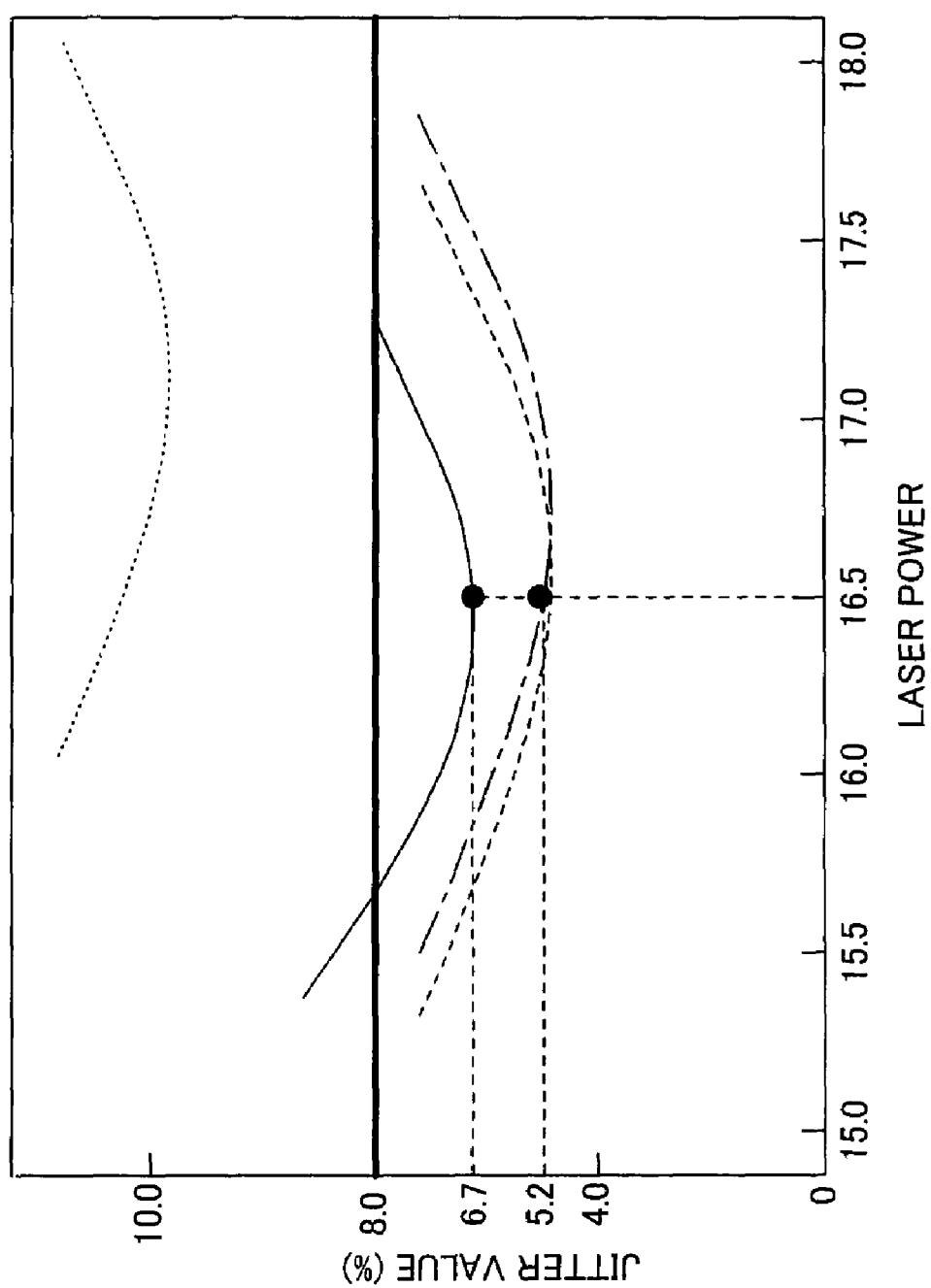
FIG. 10 is a graph showing correlations between laser power and jitter value, for various Po/Pm ratios.

Incidentally, it is obvious also from a graph of FIG. 10 that obtaining the good reproduction quality by modifying the Po/Pm ratio is reasonable. FIG. 10 shows a graph to display a correlation between the laser power and the jitter value for various Po/Pm ratios.

As seen from FIG. 10, the jitter values of the data recorded with the stepwisely modified Po/Pm ratio depend on the Po/Pm ratio, even in the case that they are recorded with the same laser power. For example, in the case that the Po/Pm ratio is "1.60", the jitter value is "6.7%" when the laser power is "16.5 mW". On the other hand, in the case that the Po/Pm ratio is decremented by 0.05 (i.e. the Po/Pm ratio is "1.55"), the jitter value is "5.2%" when the laser power is "16.5 mW". That is, it is possible to considerably reduce the jitter value (about 1.5% in this case) by controlling the Po/Pm ratio as a parameter (modified "0.05" in this case). Accordingly, detecting the suitable Po/Pm ratio for the recording is very effective and efficient in view of the improvement in the reproduction quality of the recorded data.

Figure 11:
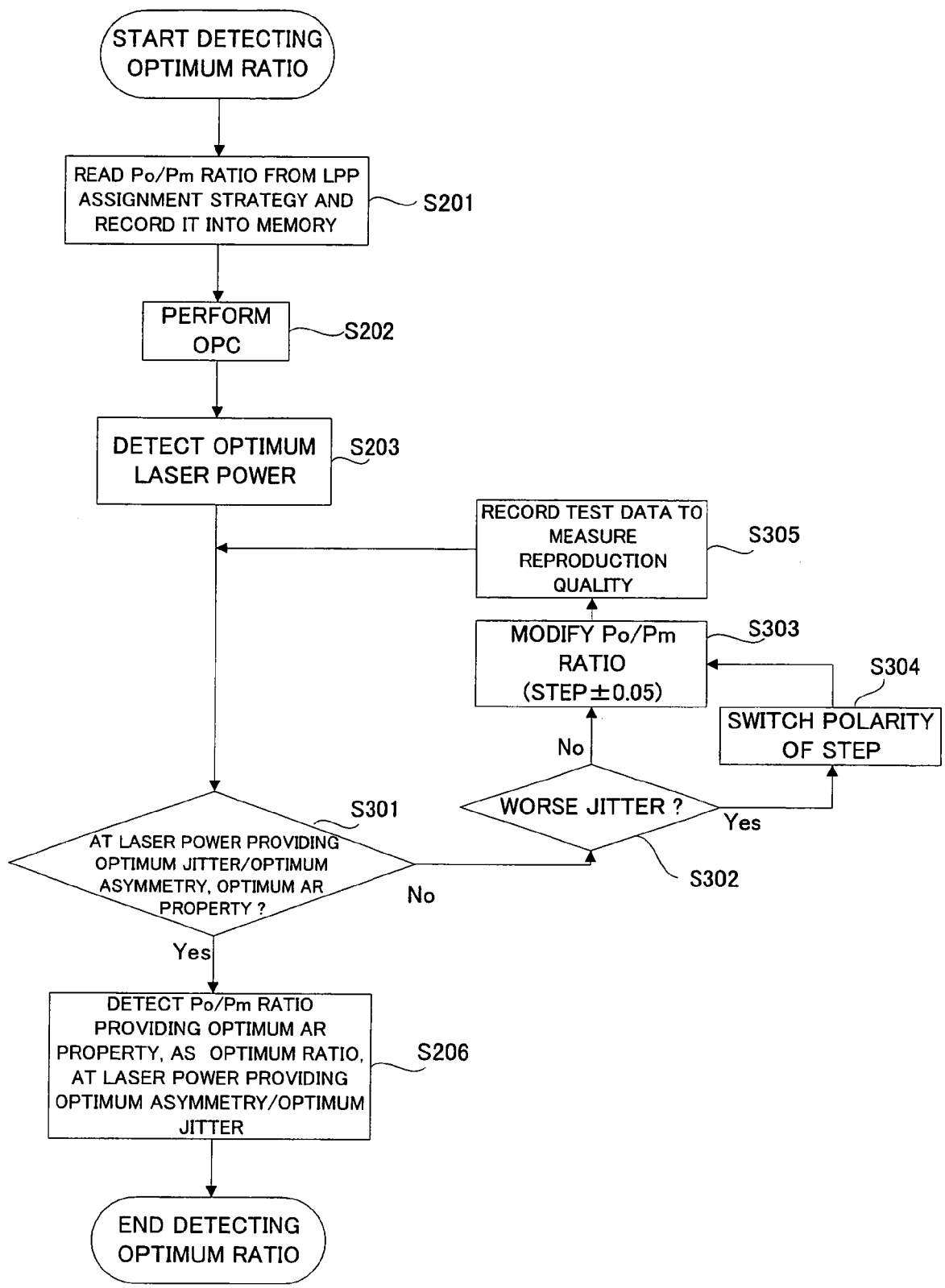
FIG. 11 is a flow chart conceptually showing an operational flow of another examples in the first exemplary operation of the information record apparatus in this example.

Incidentally, in the above explanation about the first exemplary operation, the optimum ratio is detected on the basis of the correlation information generated by modifying the Po/Pm ratio as appropriate after the optimum laser power is detected. However, this procedure is not exclusive. In short, any procedure in which the optimum ratio is detected by recording the test data with the laser beam LB irradiated on the basis of the driving pulse having various Po/Pm ratios modified at the optimum laser power detected in the OPC is encompassed within the first exemplary operation. For example, in another example of the first exemplary operation as shown in FIG. 11, if the reproduction quality satisfies a certain or predetermined condition, in the case that the test data is recorded and the recorded test data is reproduced for every modification of the Po/Pm ratio, the Po/Pm ratio in that case may be detected as the optimum ratio. FIG. 11 conceptually shows another operational flow in the first exemplary operation.

As shown in FIG. 11, in each operation from step S201 to step S203, the optimum laser power is detected in the same manner as explained with reference to FIG. 5. Then, with the aid of the operation of the CPU 550 as an example of "the judging device" according to the present invention, it is judged whether or not the AR property is optimum at the laser power providing the optimum jitter value or the optimum asymmetry (i.e. the optimum laser power detected at step S203).

From this judgement, if it is judged that the AR property is optimum (step S301: Yes), the Po/Pm ratio is detected as the optimum ratio when this optimum laser power is detected (step S302).

On the other hand, if it is judged that the AR property is not optimum (step S301: No), then it is judged whether or not the jitter value becomes worse than that of the last judgement (step S302). For example, if the jitter value is "7.1%" at present time, and the jitter value is "7.9" at the last time, then it is judged that the jitter value is worsen. Incidentally, it may be judged whether or not the asymmetry becomes worse, instead of or in addition to the jitter value.

From this judgement, if it is judged that the jitter value does not become worse (step S302: No), the Po/Pm ratio is modified (step S303). In this case, for example, the Po/Pm ratio may be incremented by "0.05", or decremented by "0.05". If the Po/Pm ratio is modified at the first time, the Po/Pm ratio may be increased or decreased by default.

On the other hand, if it is judged that the jitter value becomes worse (step S302: Yes), the Po/Pm ratio is modified (step S303) after the polarity of the step relating to the Po/Pm ratio modification is changed (step S304). That is, the polarity is changed to decrease the Po/Pm ratio if the Po/Pm ratio is increased at the last modification, or to increase the Po/Pm ratio if the Po/Pm ratio is decreased at the last modification.

Naturally, when the judgment is done at the first time at step S302, Po/Pm ratio may be simply incremented by "0.05" or simply decremented by "0.05", because there is no previously measured jitter value.

Furthermore in this case, the modification amount of the Po/Pm ratio may be changed. For example, if the jitter value becomes worse, the polarity may be changed and the modification amount may be decreased, so that the Po/Pm ratio is to be detected providing the optimum AR property. Additionally, if needed, the polarity of the modification amount may not be changed, even if the jitter becomes worse.

Then, on the basis of the modified Po/Pm ratio, the test data is recorded in a predetermined record area on the optical disc 100 (step S305). Additionally, the reproduction quality of the test data is measured by reproducing the recorded test data (step S305). On the basis of the reproduction quality, the judgement at step S301 is done again to detect the optimum ratio.

The optimum ratio can be detected from this operation, so that the above various advantages are obtained. Additionally, if the optimum ratio can be detected, only a minimum change (or modification) of the Po/Pm ratio is required, resulting in the efficient detection of the optimum ratio.

As the result, according to the information record apparatus 1 of this embodiment, the suitable Po/Pm ratio can be suitably detected as the optimum ratio. Accompanying with this, the reproduction of the recorded data can be improved.

Furthermore, in this embodiment, the LPP is discussed as a specific example of "the pre-information" according to the present invention. Nevertheless, the "pre-information" is not limited to the LPP. For example, in a DVD+R/RW as a specific example of the optical disc 100, wobbles are formed by undulating groove tracks with a predetermined cycle. Furthermore, a specific example of "the pre-information" according to the present invention is recorded in wobbles through a BPM (Bi Phase Modulation). Accordingly, in this case, it is preferable to perform various operation of this embodiment (in particular, the detection of the optimum ratio), on the basis of a reading error rate or the like of wobbles (e.g. ATIP (Absolute Time In Pre-groove) and so on), instead of the AR property.

Furthermore, a modulation factor of the RF signal as the reproduction quality, a PI error that is an error rate obtained by counting an error number when the data is reproduced, or an error rate of the RF signal itself and so on may be used, in addition to or instead of the AR property.

(3) Second Exemplary Operation

Figure 12:
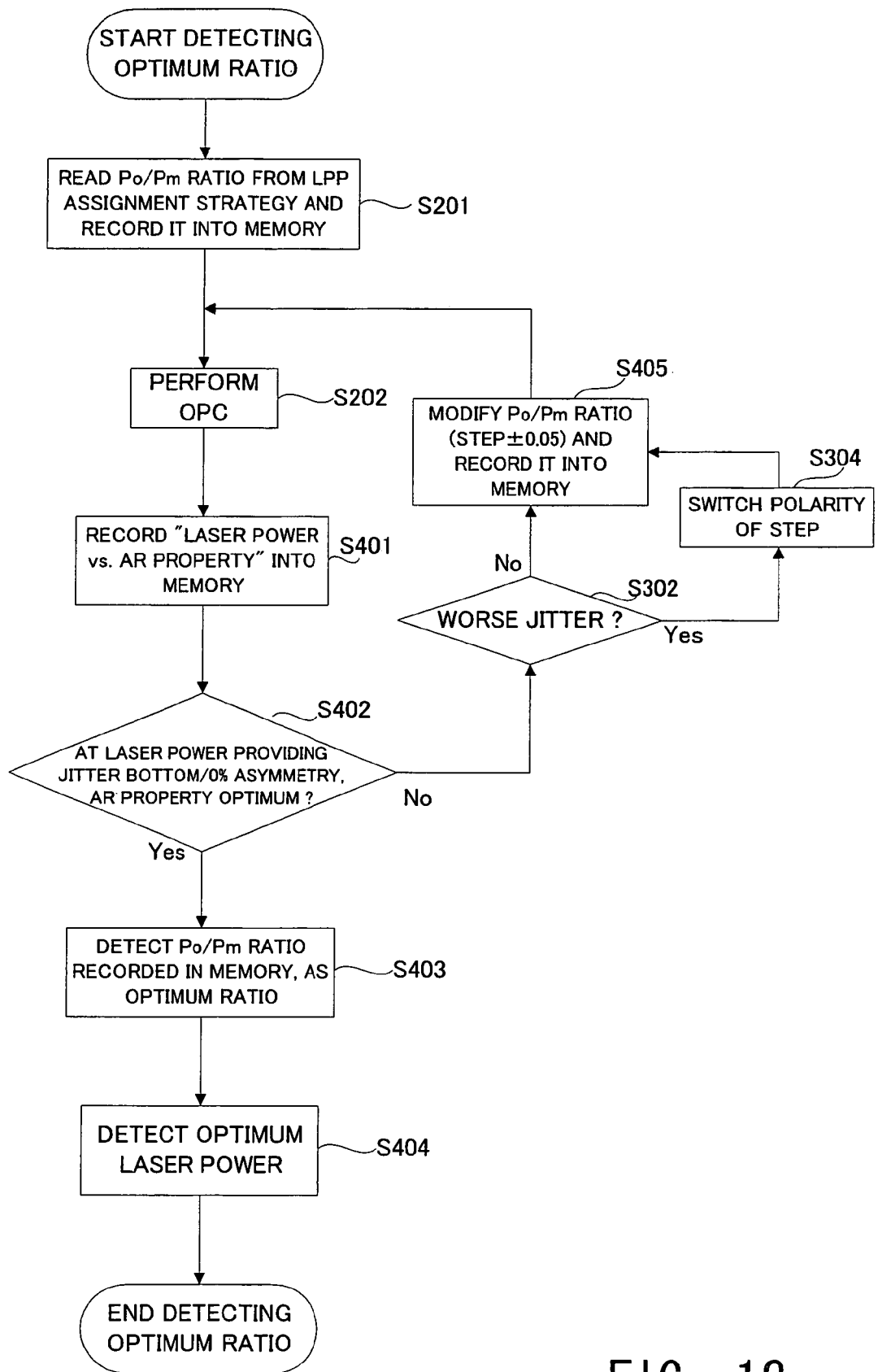
FIG. 12 is a flow chart conceptually showing a detective operation in the second exemplary operation of the information record apparatus in this example.
Figure 13:
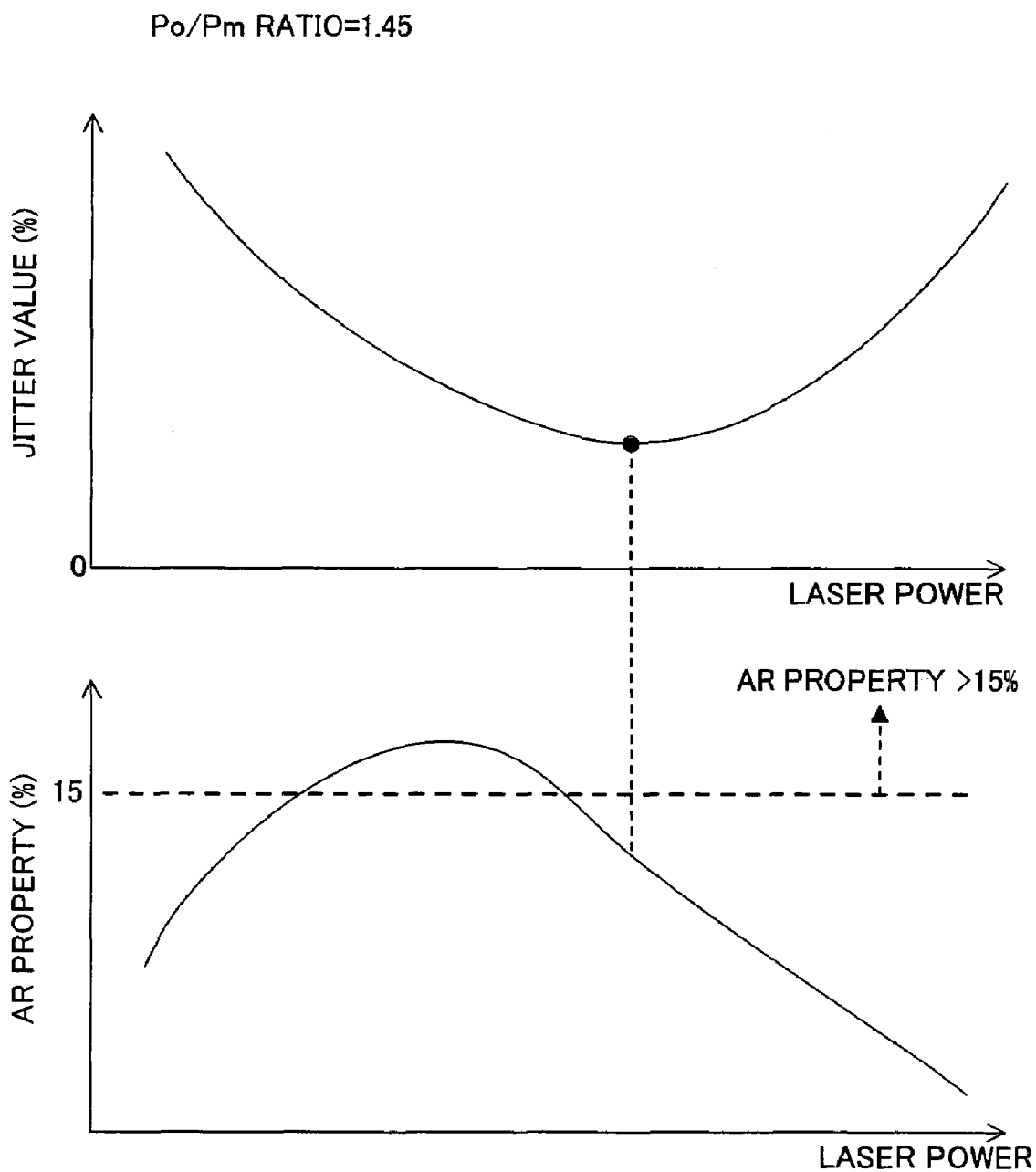
FIG. 13 shows graphs indicating a specific example of a correlation between laser power and jitter value, as well as a correlation between laser power and AR property, generated by the OPC, in the example of the information record apparatus.
Figure 14:
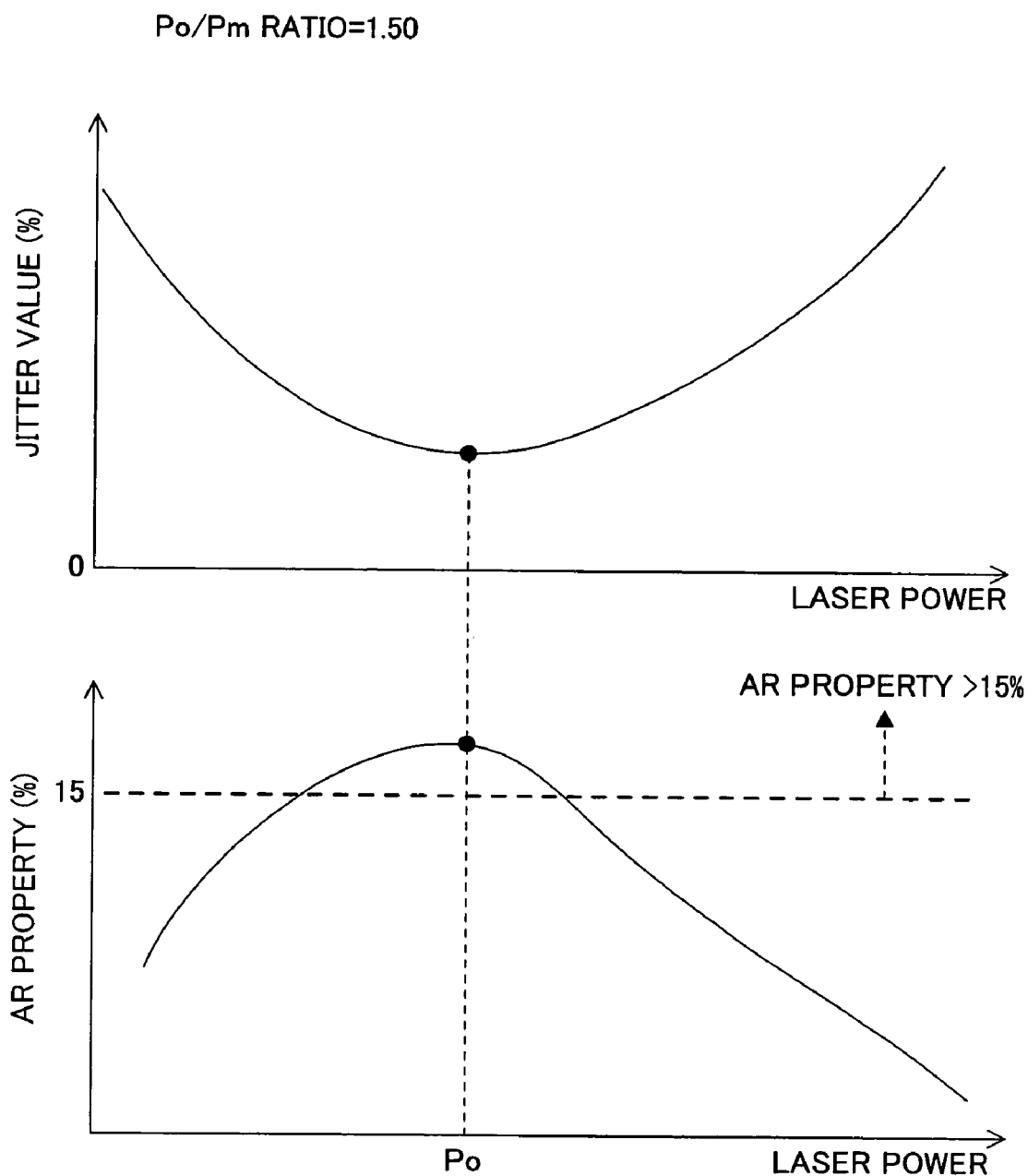
FIG. 14 shows graphs indicating another specific example of a correlation between laser power and jitter value, as well as a correlation between laser power and AR property, generated by the OPC, in the example of the information record apparatus.

Now, with reference to FIG. 12 to FIG. 14, the second exemplary operation is discussed. FIG. 12 conceptually shows an operational flow of the detection in the second exemplary operation.

Incidentally, different from the first exemplary operation, the second exemplary operation is a procedure for detecting the optimum ratio by modifying the pulse ratio during the OPC. That is, if the reproduction quality measured by reproducing an OPC patterns recorded by an OPC performed at a certain pulse ratio does not meet a predetermined reference, the optimum ratio is detected by performing the OPC again after the pulse ratio is modified.

As shown in FIG. 12, each operation from step S201 to step S202, the OPC is performed as explained above with reference to FIG. 5. Then, the correlation information indicating a correlation between the laser power obtained by the OPC and various reproduction qualities (see FIG. 7) is stored in the memory 560 (step S401).

Then, with the aid of the CPU 550 as a specific example of "the judging device" according to the present invention, it is judged whether or not the AR property is optimum at the laser power providing the minimum jitter value or the 0% of the asymmetry, on the basis of the correlation information recorded at step S401 (step S402).

From this judgement, if it is judged that the AR property is optimum (step S402: Yes), the Po/Pm ratio when the OPC is performed at step S202 is detected as the optimum ratio (step S403). Then, the laser power detected in the OPC is determined as the optimum laser power (step S404).

On the other hand, if it is judged that the AR property is not optimum (step S402: No), then it is judged whether or not the jitter value becomes worse than that of the last judgement (step S302).

Incidentally, in this case, if it is judged whether or not the AR property corresponding to the laser power providing the jitter bottom is optimum at the judgement at step S402, it is preferably judged whether or not the jitter value becomes worse. On the other hand, if it is judged whether or not the AR property corresponding to the laser power providing 0% of the asymmetry is optimum at the judgement at step S402, it is preferably judged whether or not the asymmetry becomes worse.

From this judgement, if it is judged that the jitter value does not become worse (step S302: No), the Po/Pm ratio is modified (step S303). On the other hand, if it is judged that the jitter value becomes worse (step S302: Yes), the Po/Pm ratio is modified, after the polarity of the step relating to the Po/Pm ratio modification (step S304).

Then, on the modified Po/Pm ratio, the OPC is performed again at step S202. Then the optimum ratio is detected by repeating the following operations.

Now, an explanation is made on the judgement at step S402, with reference to the correlation information shown in FIG. 13 and FIG. 14. FIG. 13 and FIG. 14 are graphs indicating correlations generated by the OPC between the laser power and the jitter value/the AR property, respectively.

Now, it is assumed that the correlation information as shown in FIG. 13 is generated by the OPC at step S202 in FIG. 2. It is also assumed that the Po/Pm ratio is "1.45" in this case. In this case, the AR property indicates a value under 15%, at the laser providing the minimum jitter value. That is, it is judged that the AR property in this case is not optimum, and then the process goes to step S302 in FIG. 12. so that the OPC is performed again after the Po/Pm ratio is modified.

Now, it is assumed that the Po/Pm ratio is modified to increase "0.05" in this case. Then, the OPC of step 202 in FIG. 12 is done again to newly generate the correlation information shown in FIG. 14. The Po/Pm ratio in this case is modified to "1.50". In this case, the AR property indicates a value beyond 15%, at the laser power providing the minimum jitter value. That is, in this case, it is judged that the AR property is optimum, and then the process goes to step S403 in FIG. 12, so that the modified Po/Pm ratio "1.50" is detected as the optimum ratio.

Thus, also in the second exemplary operation to modify the Po/Pm ratio simultaneously with the OPC, the optimum ratio can be appropriately detected in the same manner with the first exemplary operation. Accordingly, it is possible to improve the reproduction quality of the recorded data. Additionally, detecting the optimum ratio alleviates the Po/Pm modification (or change) to the minimum, resulting in the efficient detection of the optimum ratio.

(4) Third Exemplary Operation

Figure 15:
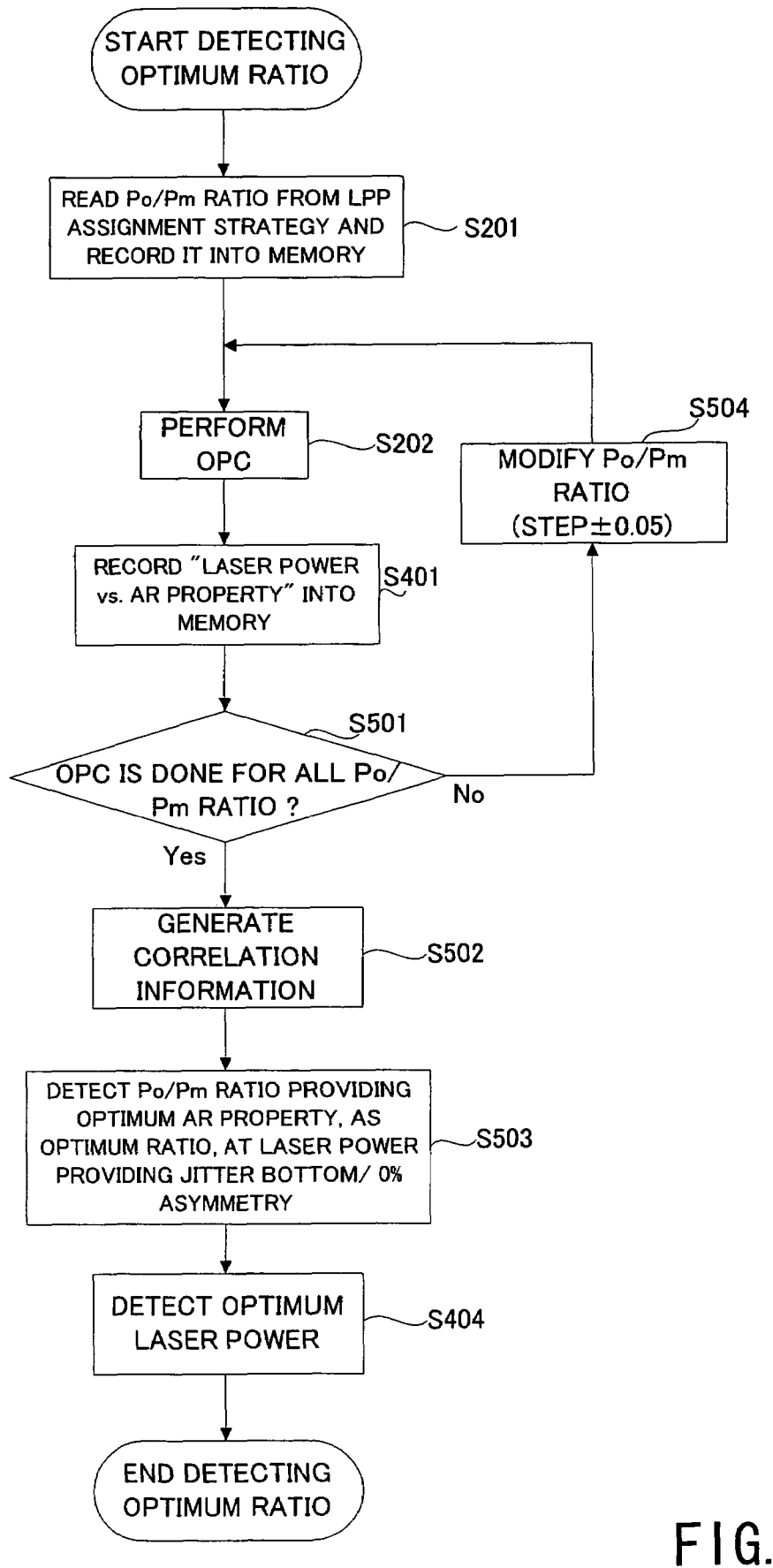
FIG. 15 is a flow chart conceptually showing a flow of the detection in the third exemplary operation of the information record apparatus of this example.

Now, with reference to FIG. 15, the third exemplary operation will be discussed. FIG. 15 conceptually shows an operational flow of the detection in the third exemplary operation.

Incidentally, the third exemplary operation is a procedure to detect the optimum ratio after the correlation information indicating a correlation between the aforementioned Po/Pm ratio and various reproduction qualities (see FIG. 8) is firstly generated.

As shown in FIG. 15, in each operation from step S201 to step S202, the OPC is performed as explained with reference to FIG. 5. Then, the correlation information indicating a correlation between the laser power obtained by the OPC and various reproduction qualities (see FIG. 7) is recorded into the memory 560 (step S401).

Then, it is judged whether or not the OPC is completed for all Po/Pm ratios selected or defined for the OPC in advance (step S501). The selected or defined Po/Pm ratio for the OPC may be predetermined, or may be designated by the information record apparatus 1 or the user thereof, and so on. For example, if it is defined that the OPC is performed for the Po/Pm ratio in a range from "1.40" to "1.65" and incremented or decremented by "0.05", it is judged whether or not the OPC is performed for the Po/Pm ratio of "1.40", "1.45", "1.50", "1.55" and "1.60".

From this judgement, if it is judged that the OPC is not completed for all the Po/Pm ratios (step S501: No), the Po/Pm ratio is modified appropriately (step S504). Then, the OPC is performed again at step S202 for the modified Po/Pm ratio.

On the other hand, if it is judged that the OPC is completed for all Po/Pm ratios (step S501: Yes), then the correlation information indicating a correlation between the Po/Pm ratio and various reproduction qualities, on the basis of the correlation information indicating a correlation between the laser power and various reproduction qualities stored in the memory 560 (step S502).

Specifically, the asymmetry and AR property corresponding to the laser power providing the jitter bottom are respectively extracted from the correlation information generated by the OPC at step S202 for example. This operation is repeated as many as the number of Po/Pm ratios for which the OPC is performed. Plotting the Po/Pm ratio as the horizontal axis and the reproduction quality as the vertical axis provides a new correlation information as shown in FIG. 8. This correlation information may be stored in the memory 560, or may be recorded in the optical disc 100.

Incidentally, the jitter value and the AR property corresponding to the laser power providing the asymmetry of 0% may be extracted respectively, instead of extracting respectively the asymmetry and the AR property corresponding to the laser power providing the jitter bottom.

Then, on the basis of the obtained correlation information, the Po/Pm ratio providing the optimum AR property corresponding to the laser power providing the asymmetry of 0% or the jitter bottom is detected as the optimum ratio (step S503). For example, at step S502, if the correlation information is generated by extracting the asymmetry and the AR property corresponding to the laser power providing the jitter bottom, then all the approximated curves of the jitter value obtained on the graph meet the condition to be the jitter bottom. For this, it is sufficient to detect the Po/Pm ratio providing the optimum AR property. In this case, it is preferable to detect the Po/Pm ratio providing the optimum AR property (more preferably "0") as the optimum ratio. Alternatively, at step S502, the correlation information is generated by extracting respectively the jitter value and the AR property corresponding to the laser power providing the asymmetry of "0", all the approximated curves of the asymmetry obtained on the graph meet the condition to be "0". For this, it is sufficient to detect the Po/Pm ratio providing the optimum AR property. In this case, it is more preferable to further detect the Po/Pm ratio providing the optimum jitter value (more preferably a lesser jitter value) as the optimum ratio.

Thus, also in the third exemplary operation to generate in advance the correlation information indicating the correlation between the Po/Pm ratio and various reproduction qualities, the optimum ratio can be appropriately detected. Accordingly, the aforementioned various advantages can be obtained.

(5) Modified Example of Recording

Figure 16:
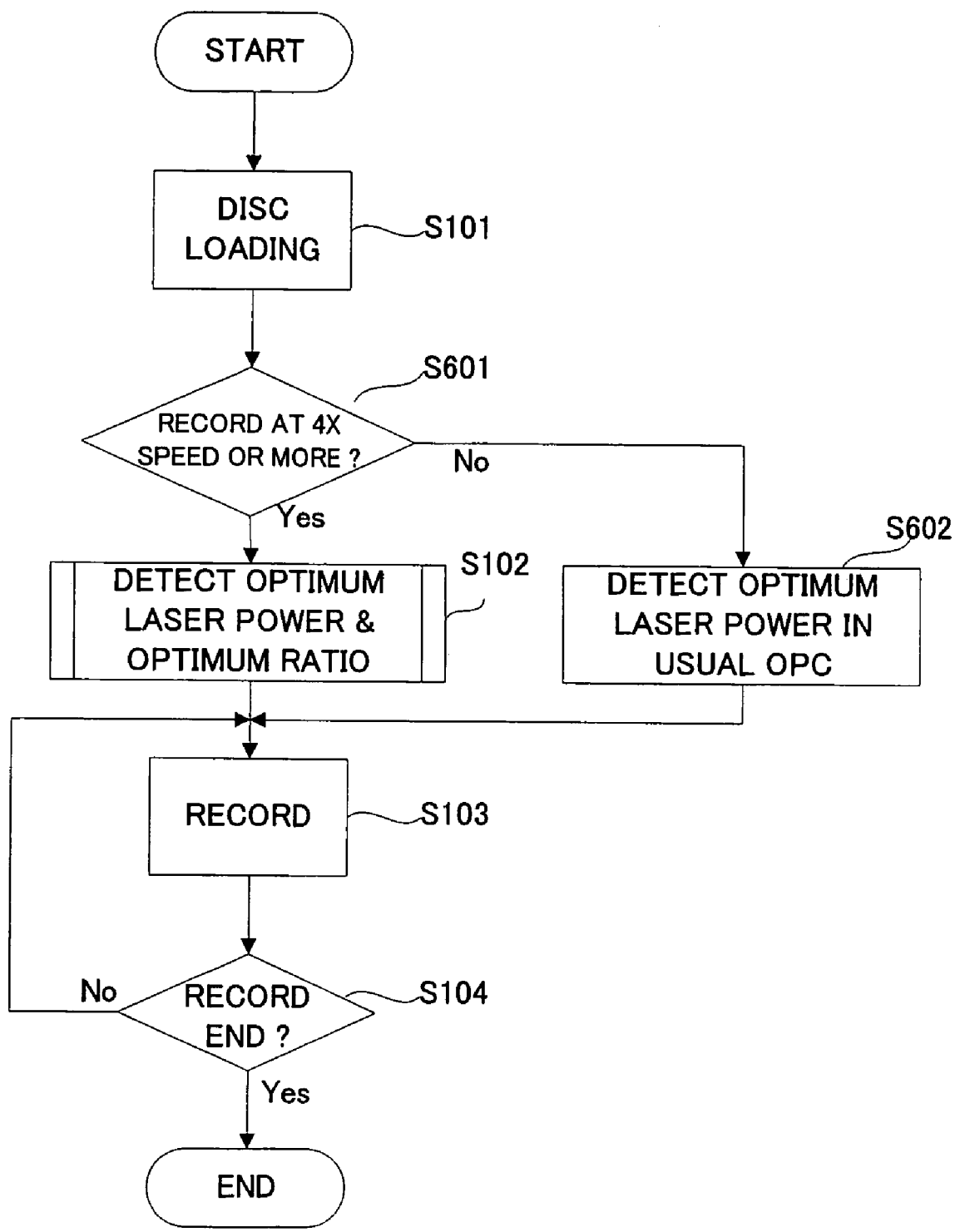
FIG. 16 is a flow chart conceptually showing a general flow of the recording operation in a modified example of the information record apparatus of this example.

Now, an explanation is further made on a modified example of the aforementioned recording operation, with reference to FIG. 16. FIG. 16 conceptually shows a general operational flow of recording in the modified example.

As shown in FIG. 16, the optical disc 100 is firstly loaded (step S101), and then it is judged whether or not the recording is performed at a speed four or more times (4× speed or more) faster than the reference recording speed (1× speed) (step S601).

From this judgement, if it is judged that the recording is performed at 4× speed or more (step S601: Yes), the optimum laser power and the optimum ratio are detected as exemplified in the first to third exemplary operations (step S102). Then, the following recoding operations are performed (step S102). The recording operations may be continued or may be terminated depending on the situation.

On the other hand, if it is judged that the recording is performed at a speed below the 4× speed (e.g. 1× or 2× speed) (step S601: No), the optimum laser power is detected by performing the usual OPC (step S602). Then, the following recording is performed (step S103). In this case, the recording is performed by irradiating the laser beam LB on the basis of the driving pulse defined by the optimum laser power detected at step S602 and LPP assignment strategy for example. Then, the recording operation may be continued or terminated depending on the situation.

Thus, the optimum ratio is detected in accordance with the recording speed with concerning about the improvement of the AR property as mentioned above, in the high speed recording (i.e. the recoding at 4× speed or more) in which the deterioration of the AR property is serious problem. Thereby, in the high speed recording, the aforementioned various advantages can be obtained.

On the other hand, in the low speed recording (i.e. the recording at a speed below 4× speed) in which the deterioration of the AR property is not so serious, it is possible to suitably record the data, without sacrificing significantly the AR property, with the aid of the LPP assignment strategy for example, even if the detection of the optimum ratio is omitted. Thus, since the detection of the optimum ratio is not necessarily done, it is possible to alleviate the processing load of the information record apparatus 1.

Also in this modified example, it is needless to say that the detection of the optimum ratio may be performed if needed, depending on the record quality of the data recorded in the low speed recording.

In the above example, the optical disc 100 and the recorder thereof are discussed as examples of the information record medium and the information record apparatus respectively. Nevertheless, the present invention is not limited to the optical disc and the recorder thereof, but applicable to various record medium and the recorder for them compatible with other high density recording or high transfer rate.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2004-036292 filed on Feb. 13, 2004 including the specification, claims, drawings and summary is incorporated herein by reference in its entirety.

What is claimed is:

1. An information record apparatus comprising:
a recording device for recording record information into an information record medium where pre-information for controlling a recording of the record information is recorded in advance, by irradiating the information record medium with a laser beam whose power is varied depending on a driving pulse;
a first controlling device for modifying the driving pulse into at least a top pulse and a middle pulse;

an optimum ratio detecting device for detecting an optimum ratio that is a pulse ratio at which a first reproduction quality that is a reproduction quality of the pre-information meets a first reference, on the basis of at least a first correlation information to indicate a correlation between the first reproduction quality and a pulse ratio of the top pulse and the middle pulse; and a second controlling device for modifying the driving pulse in accordance with a pulse ratio corresponding to the optimum ratio.

2. The information record apparatus according to claim 1, further comprising:

a first writing device for writing a first test information for a test recording into the information record medium, with varying the laser power and varying the driving pulse corresponding to the varied laser power in accordance with a predetermined pulse ratio;

an optimum power detecting device for detecting the laser power, as an optimum power, at which a second reproduction quality that is a reproduction quality of the first test information meets a second reference, by reproducing the first test information;

a second writing device for writing a second test information for a test recording into the information record medium, with varying the pulse ratio of the driving pulse corresponding to the optimum power; and a generating device for measuring the first reproduction quality of the pre-information recorded in advance in a record area where the second test information is written, and generating the first correlation information on the basis of the measured first reproduction quality and the pulse ratio corresponding to the measured first reproduction quality.

3. The information record apparatus according to claim 2, wherein the optimum power detecting device detects the laser power, as the optimum power, at which at least one of asymmetry and a jitter value as factors of the second reproduction quality meets the second reference.

4. The information record apparatus according to claim 1, further comprising:

a writing device for writing a test information for a test recording into the information record medium, with varying the laser power and the pulse ratio of the driving pulse corresponding to the varied laser power; and a generating device for measuring the first reproduction quality of the pre-information recorded in advance in a record area where the test information is written, and generating the first correlation information on the basis of the measured first reproduction quality and the varied pulse ratio.

5. The information record apparatus according to claim 4, wherein the optimum ratio detecting device further comprises a judging device for judging whether or not the first reproduction quality of the pre-information recorded in advance in the record area where the test information is written meets the first reference, and the writing device writes the test information with varying the pulse ratio, in a case that the judging device judges that the first reproduction quality does not meet the first reference.

6. The information record apparatus according to claim 2, wherein the recording device records the generated first correlation information into the information record medium.

7. The information record apparatus according to claim 2, further comprising a storing device for storing the generated first correlation information.

8. The information record apparatus according to claim 1, wherein the optimum ratio detecting device detects the pulse ratio, as the optimum ratio, at which the first reproduction quality meets the first reference, in a case that a second reproduction quality that is a reproduction quality of record information recorded in a record area where the pre-information is recorded in advance meets a second reference.

9. The information record apparatus according to claim 1, wherein the record information is recorded into the information record medium at a recording speed at least four times faster than a reference recording speed for recording the recording information, in addition to or instead of being recorded at a recording speed at least four times slower than the reference recording speed.

10. The information record apparatus according to claim 9, wherein the optimum ratio detecting device detects the pulse ratio, as the optimum ratio, at which the first reproduction quality meets the first reference, in a case that the record information is recorded at the recording speed at least four times faster than the reference recording speed, or the optimum ratio detecting device detects the pulse ratio, as the optimum ratio, at which at least one of the jitter value and the asymmetry value as a second reproduction quality that is a reproduction quality of the record information meets a second reference, in a case that the record information is recorded at a recording speed below the recording speed at least four times faster than the reference recording speed.

11. The information record apparatus according to claim 1, wherein the pre-information is recorded in advance in the information record medium, by means of pre-pits formed on record tracks of the information record medium.

12. The information record apparatus according to claim 11, further comprising a measuring device for measuring the first reproduction quality on the basis of a maximum amplitude and a minimum amplitude of a push-pull signal generated by reproducing the pre-pits.

13. The information record apparatus according to claim 11, further comprising a measuring device for measuring the first reproduction quality on the basis of a reproduction error rate of the pre-information obtained by reproducing the pre-pits.

14. The information record apparatus according to claim 1, wherein the pre-information is recorded in advance in the information record medium, by means of a modulation signal applied on record tracks of the information record medium wobbling in a predetermined cycle.

15. An information record method for recording record information into an information record medium where pre-information for controlling a recording of the record information is recorded in advance, by irradiating the information record medium with a laser beam whose power is varied depending on a driving pulse, said method comprising:

a first controlling process of modifying the driving pulse into at least a top pulse and a middle pulse;

an optimum ratio detecting process of detecting an optimum ratio that is a pulse ratio at which a first reproduction quality that is a reproduction quality of the pre-information meets a first reference, on the basis of at least a first correlation information to indicate a correlation between the first reproduction quality and a pulse ratio of the top pulse and the middle pulse; and a second controlling process of modifying the driving pulse in accordance with a pulse ratio corresponding to the optimum ratio.

16. A computer program stored on a computer-readable storage medium for tangibly embodying a program of instructions executable by a computer to make the computer in an information recording apparatus performs a method comprising:

recording record information into an information record medium where pre-information for controlling a recording of the record information is recorded in advance, by irradiating the information record medium with a laser beam whose power is varied depending on a driving pulse;

modifying the driving pulse into at least a top pulse and a middle pulse;

detecting an optimum ratio that is a pulse ratio at which a first reproduction quality that is a reproduction quality of the pre-information meets a first reference, on the basis of at least a first correlation information to indicate a correlation between the first reproduction quality and a pulse ratio of the top pulse and the middle pulse;

and modifying the driving pulse in accordance with a pulse ratio corresponding to the optimum ratio.

* * * * *